(12) United States Patent
Danilov et al.

(10) Patent No.: US 11,513,871 B2
(45) Date of Patent: Nov. 29, 2022

(54) EMPLOYING TRIGGERED RETENTION IN AN ORDERED EVENT STREAM STORAGE SYSTEM

(71) Applicant: EMC IP Holding Company LLC, Hopkinton, MA (US)

(72) Inventors: Mikhail Danilov, Saint Petersburg (RU); Igor Medvedev, Seattle, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 47 days.

(21) Appl. No.: 17/038,102

(22) Filed: Sep. 30, 2020

(65) Prior Publication Data

US 2022/0100588 A1   Mar. 31, 2022

(51) Int. Cl.
G06F 9/54 (2006.01)
G06F 9/4401 (2018.01)
G06F 9/451 (2018.01)

(52) U.S. Cl.
CPC ............ G06F 9/542 (2013.01); G06F 9/4401 (2013.01); G06F 9/452 (2018.02)

(58) Field of Classification Search
None
See application file for complete search history.

(56) References Cited

U.S. PATENT DOCUMENTS

| | | | |
|---|---|---|---|
| 3,617,587 A | 11/1971 | Nayar et al. | |
| 5,826,977 A | 10/1998 | Fowler et al. | |
| 7,430,570 B1 | 9/2008 | Srinivasan et al. | |
| 8,572,091 B1 | 10/2013 | Sivasubramanian et al. | |
| 8,655,825 B2 | 2/2014 | Roesch et al. | |
| 8,825,848 B1 | 9/2014 | Dotan et al. | |
| 8,984,248 B2 | 3/2015 | Morishita et al. | |

(Continued)

FOREIGN PATENT DOCUMENTS

| | | |
|---|---|---|
| CA | 2672879 | 4/2008 |
| CN | 1708029 | 12/2005 |

(Continued)

OTHER PUBLICATIONS

Akidau et al., "MillWheel: Fault-Tolerant Stream Processing at Internet Scale" Proceedings of the VLDB Endowment, vol. 6, No. 11, 2013, 12 pages.

(Continued)

*Primary Examiner* — Syed A Roni
(74) *Attorney, Agent, or Firm* — Amin, Turocy & Watson, LLP

(57) ABSTRACT

Retention of events of an ordered event stream according to at least one triggered retention policy is disclosed. Expiration of events stored in a segment of an ordered event stream (OES) can be desirable. New events can be added to a head of an OES segment, and pruning events from a tail of the OES segment can be desirable. Processing applications can predicate event retention, e.g., restricting expiration of an event, on at least one triggered retention policy. In some embodiments, an additional fixed retention policy can be combined with the triggered retention. The disclosed retention can be performed at the event-level or at less granular levels, e.g., segment-level, OES-level, etc., e.g., via batching of events.

20 Claims, 10 Drawing Sheets

(56) References Cited

U.S. PATENT DOCUMENTS

| | | | |
|---|---|---|---|
| 9,407,521 B1 | 8/2016 | Kulkarni | |
| 9,514,018 B2 | 12/2016 | Sikri | |
| 9,639,589 B1 | 5/2017 | Theimer et al. | |
| 9,753,932 B1 | 9/2017 | Brow et al. | |
| 9,898,482 B1 | 2/2018 | Bono | |
| 9,965,215 B1 | 5/2018 | Vazhenin et al. | |
| 10,338,834 B1 | 7/2019 | Dighe et al. | |
| 10,565,208 B2 | 2/2020 | Thou, Jr. et al. | |
| 10,860,457 B1 | 12/2020 | Evenson et al. | |
| 10,867,033 B2 | 12/2020 | Keren et al. | |
| 11,016,826 B2 | 5/2021 | Lehmann | |
| 11,194,638 B1 | 12/2021 | Danilov et al. | |
| 11,314,779 B1 | 4/2022 | Jain | |
| 2004/0199524 A1 | 10/2004 | Rys et al. | |
| 2005/0025152 A1 | 2/2005 | Georgiou et al. | |
| 2005/0055519 A1* | 3/2005 | Stuart | |
| 2007/0047635 A1 | 3/2007 | Stojanovic et al. | |
| 2007/0220518 A1 | 9/2007 | Verbowski et al. | |
| 2008/0059724 A1 | 3/2008 | Stifter, Jr. | |
| 2008/0184262 A1 | 7/2008 | Ginis et al. | |
| 2008/0288713 A1 | 11/2008 | Lee et al. | |
| 2008/0301135 A1 | 12/2008 | Alves et al. | |
| 2009/0182784 A1 | 7/2009 | Rohit et al. | |
| 2010/0083098 A1 | 4/2010 | Leme et al. | |
| 2010/0125794 A1 | 5/2010 | Hampton et al. | |
| 2010/0205163 A1 | 8/2010 | Eshghi et al. | |
| 2011/0126099 A1 | 5/2011 | Anderson et al. | |
| 2011/0131588 A1 | 6/2011 | Allam et al. | |
| 2011/0249147 A1 | 10/2011 | Ishii | |
| 2012/0102503 A1 | 4/2012 | Meijer et al. | |
| 2012/0109985 A1 | 5/2012 | Chandrasekaran | |
| 2012/0198027 A1 | 8/2012 | Hetzler et al. | |
| 2013/0226931 A1 | 8/2013 | Hazel et al. | |
| 2013/0275808 A1 | 10/2013 | McNeeney et al. | |
| 2014/0006465 A1 | 1/2014 | Davis et al. | |
| 2014/0089264 A1 | 3/2014 | Talagala et al. | |
| 2014/0223115 A1 | 8/2014 | Dinkjian et al. | |
| 2015/0169449 A1 | 6/2015 | Barrell et al. | |
| 2015/0172120 A1 | 6/2015 | Dwarampudi et al. | |
| 2015/0341212 A1 | 11/2015 | Hsiao et al. | |
| 2015/0355862 A1 | 12/2015 | Hayes et al. | |
| 2015/0363245 A1 | 12/2015 | Mutschler | |
| 2016/0042008 A1 | 2/2016 | Tripathy et al. | |
| 2016/0063080 A1 | 3/2016 | Nano et al. | |
| 2016/0210061 A1 | 7/2016 | Soncodi et al. | |
| 2016/0321287 A1 | 11/2016 | Luthra et al. | |
| 2016/0337435 A1 | 11/2016 | Nigam et al. | |
| 2016/0357476 A1 | 12/2016 | Chen et al. | |
| 2017/0075832 A1 | 3/2017 | Bhimani et al. | |
| 2017/0075947 A1 | 3/2017 | Kurilov et al. | |
| 2017/0177249 A1 | 6/2017 | Kurilov et al. | |
| 2017/0177263 A1 | 6/2017 | Das et al. | |
| 2017/0212891 A1 | 7/2017 | Pundir et al. | |
| 2017/0213127 A1 | 7/2017 | Duncan | |
| 2017/0255392 A1 | 9/2017 | Nakashima | |
| 2018/0101842 A1 | 4/2018 | Ventura et al. | |
| 2018/0121307 A1 | 5/2018 | Braun et al. | |
| 2018/0146018 A1 | 5/2018 | Chang et al. | |
| 2018/0176244 A1 | 6/2018 | Gervais et al. | |
| 2018/0184138 A1 | 6/2018 | Shaw et al. | |
| 2018/0329644 A1 | 11/2018 | Das et al. | |
| 2018/0332325 A1 | 11/2018 | Kaitchuck | |
| 2018/0332365 A1 | 11/2018 | Kaitchuck et al. | |
| 2018/0332366 A1 | 11/2018 | Paduroiu | |
| 2018/0332367 A1 | 11/2018 | Kaitchuck et al. | |
| 2018/0336256 A1 | 11/2018 | Li et al. | |
| 2018/0345140 A1 | 12/2018 | Posin | |
| 2019/0004863 A1 | 1/2019 | Mainali et al. | |
| 2019/0026301 A1 | 1/2019 | Wang et al. | |
| 2019/0057138 A1 | 2/2019 | Knowles et al. | |
| 2019/0129806 A1 | 5/2019 | Hsu et al. | |
| 2019/0138494 A1 | 5/2019 | Inoue | |
| 2019/0197173 A1 | 6/2019 | Tahara et al. | |
| 2019/0278849 A1 | 9/2019 | Chandramouli et al. | |
| 2019/0340180 A1 | 11/2019 | Barsness et al. | |
| 2019/0349422 A1 | 11/2019 | Dhruvakumar et al. | |
| 2020/0034468 A1 | 1/2020 | Lei et al. | |
| 2020/0174695 A1 | 6/2020 | Bazarsky et al. | |
| 2020/0250172 A1 | 8/2020 | Busjaeger et al. | |
| 2020/0320005 A1 | 10/2020 | Shulman et al. | |
| 2020/0344299 A1 | 10/2020 | Sohail et al. | |
| 2020/0394196 A1 | 12/2020 | Shivanna et al. | |
| 2020/0404011 A1 | 12/2020 | Gervais et al. | |
| 2021/0110328 A1 | 4/2021 | Hsiao et al. | |
| 2021/0124746 A1 | 4/2021 | Klaedtke | |
| 2021/0157520 A1 | 5/2021 | Bavishi et al. | |
| 2021/0256029 A1 | 8/2021 | Danilov et al. | |
| 2021/0342296 A1 | 11/2021 | Danilov et al. | |
| 2021/0342354 A1 | 11/2021 | Danilov et al. | |
| 2021/0365211 A1 | 11/2021 | Danilov et al. | |
| 2022/0035533 A1 | 2/2022 | Danilov et al. | |
| 2022/0182724 A1 | 6/2022 | Gupta et al. | |

FOREIGN PATENT DOCUMENTS

| | | |
|---|---|---|
| CN | 104901958 | 9/2015 |
| CN | 105591926 | 5/2016 |
| GB | 2377038 | 12/2002 |
| WO | 2002101585 | 12/2002 |
| WO | 2009014993 | 1/2009 |
| WO | 2015191120 | 12/2015 |
| WO | 2018148149 | 8/2018 |

OTHER PUBLICATIONS

Akidau et al., "The Dataflow Model: A Practical Approach to Balancing Correctness, Latency, and Cost in Massive-Scale, Unbounded, Out-of-Order Data Processing" Proceedings of the VLDB Endowment, vol. 8, No. 12, 2015, 12 pages.

"Execution Model" [https://beam.apache.org/documentation/runtime/model/]. The Apache Software Foundation. Retrieved Aug. 26, 2020, 5 pages.

"Apache Beam Programming Guide" [https://beam.apache.org/documentation/programming-guide/]. The Apache Software Foundation. Retrieved Aug. 26, 2020, 69 pages.

"What is Apache Flink?—Applications" [https://flink.apache.org/flink-applications.html#building-blocks-for-streaming-applications]. The Apache Software Foundation. Copyright 2014-2019, retrieved Aug. 26, 2020, 7 pages.

"What is Apache Flink?—Architecture" [https://flink.apache.org/flink-architecture.html]. The Apache Software Foundation. Copyright 2014-2019, retrieved Aug. 26, 2020, 3 pages.

"Stateful Function—Event-driven Application on Apache Flink" [https://flink.apache.org/stateful-functions.html]. The Apache Software Foundation. Copyright 2014-2019, retrieved Aug. 26, 2020, 8 pages.

"What is Apache Flink?—Operations" [https://flink.apache.org/flink-operations.html]. The Apache Software Foundation. Copyright 2014-2019, retrieved Aug. 26, 2020, 3 pages.

"Use Cases" [https://flink.apache.org/usecases.html]. The Apache Software Foundation. Copyright 2014-2019, retrieved Aug. 26, 2020, 5 pages.

"Introduction" [http://kafka.apache.org/intro]. The Apache Software Foundation. Copyright 2017, retrieved Aug. 26, 2020, 6 pages.

"Apache KAFKA Quickstart" [http://kafka.apache.org/quickstart]. The Apache Software Foundation. Copyright 2017, retrieved Aug. 26, 2020, 6 pages.

"Use Cases" [http://kafka.apache.org/uses]. The Apache Software Foundation. Retrieved Aug. 26, 2020, 3 pages.

"Architecture Overview" [pulsar.apache.org/docs/en/concepts-architecture-overview/]. The Apache Software Foundation. Copyright 2020, retrieved Aug. 26, 2020, 11 pages.

"Messaging" [pulsar.apache.org/docs/en/concepts-messaging/]. The Apache Software Foundation. Copyright 2020, retrieved Aug. 26, 2020, 32 pages.

"Pulsar Overview" [pulsar.apache.org/docs/en/concepts-overview/]. The Apache Software Foundation. Copyright 2020, retrieved Aug. 26, 2020, 2 pages.

(56) References Cited

OTHER PUBLICATIONS

Office Action dated Jan. 29, 2021 for U.S. Appl. No. 16/256,083, 42 pages.
Office Action dated Oct. 1, 2021 for U.S. Appl. No. 17/127,724, 41 pages.
Notice of Allowance dated Dec. 15, 2021 for U.S. Appl. No. 17/064,747, 54 pages.
Office Action dated Nov. 10, 2021 for U.S. Appl. No. 16/944,089, 75 pages.
Kleppmann, Making Sense of Stream Processing—The Philosophy Behind Apache Kafka and Scalable Stream Data Platforms; Mar. 4, 2016; retrieved from [https://hashingit.com/elements/research-resources/2016-03-04-making-sense-of-stream-processing.pdf] on Nov. 5, 2021, (Year: 2016), 183 pages.
Notice of Allowance dated Feb. 4, 2022 for U.S. Appl. No. 16/915,762, 57 pages.
Office Action dated Oct. 1, 2021 for U.S. Appl. No. 16/915,762, 57 pages.
Office Action dated Jan. 21, 2022 for U.S. Appl. No. 16/864,892, 26 pages.
Notice of Allowance dated Feb. 24, 2022 for U.S. Appl. No. 17/038,079, 55pgs.
Azhar et al., "Efficient selection of access control systems through multi criteria analytical hierarchy process", IEEE, doi: 10.1109/ICET.2012.6375419, 2012, pp. 1-8. (Year: 2012).
Rox et al., "Construction and Deconstruction of Hierarchical Event Streams with Multiple Hierarchical Layers", IEEE, doi: 10.1109/ECRTS.2008.13, 2008, pp. 201-210. (Year: 2008).
Notice of Allowance dated Feb. 18, 2022 for U.S. Appl. No. 17/083,145, 70 pgs.
Notice of Allowance dated Jun. 28, 2021 for U.S. Appl. No. 16/884,647, 39 pages.
Office Action dated Jun. 29, 2021 for U.S. Appl. No. 16/881,556, 24 pages.
Notice of Allowance dated Aug. 4, 2021 for U.S. Appl. No. 17/200,652, 51 pages.
Office Action dated Apr. 20, 2022 for U.S. Appl. No. 16/944,094, 48 pages.
M. Liu, M. Li, D. Golovnya, E. A. Rundensteiner and K. Claypool, "Sequence Pattern Query Processing over Out-of-Order Event Streams," 2009 IEEE 25th International Conference on Data Engineering, 2009, pp. 784-795, doi 10.1109/ICDE.2009.95. (Year: 2009).
Notice of Allowance dated Apr. 27, 2022 for U.S. Appl. No. 17/127,724, 19 pages.
Office Action dated May 24, 2022 for U.S. Appl. No. 17/237,535, 62 pages.
Aloysius K. Mok, Honguk Woo and Chan-Gun Lee, "Probabilistic Timing Join over Uncertain Event Streams," 12th IEEE International Conference on Embedded and Real-Time Computing Systems and Applications (RTCSA'06), 2006, pp. 17-26, doi: 10.1109/RTCSA.2006.52. (Year: 2006).
T. Onishi, J. Michaelis and Y. Kanemasa, "Recovery-Conscious Adaptive Watermark Generation for Time-Order Event Stream Processing," 2020 IEEE/ACM Fifth International Conference on Internet-of-Things Design and Implementation (IoTDI), 2020, pp. 66-78, doi: 10.1109/IoTDI49375.2020.00014. (Yean 2020).
Office Action dated Mar. 21, 2022 for U.S. Appl. No. 16/864,905, 125 pgs.
Edi Muskardin et al., "Implementation of Hashing Algorithms in Stream Mining", International Conference on Smart Systems and Technologies (SST), Oct. 2018, pp. 233-238.
Notice of Allowance dated Apr. 11, 2022 for U.S. Appl. No. 16/944,089, 87 pages.
J. C. Lee, J. Vance and R. Lysecky, "Hardware-Based Event Stream Ordering for System-Level Observation Framework," in IEEE Embedded Systems Letters, vol. 6, No. 4, pp. 81-84, Dec. 2014, doi: 10.1109/LES.2014.2359154 (Year: 2014).
Office Action dated Jul. 8, 2022 for U.S. Appl. No. 16/864,892, 33 pages.
Office Action dated Jul. 15, 2022 for U.S. Appl. No. 16/864,905, 77 pages.
Office Action dated Sep. 1, 2022 for U.S. Appl. No. 16/944,094, 25 pages.
Office Action dated Jul. 21, 2022 for U.S. Appl. No. 17/070,029, 68 pages.
Notice of Allowance dated Aug. 24, 2022 for U.S. Appl. No. 17/152,544, 55 pages.
Office Action dated Sep. 15, 2022 for U.S. Appl. No. 17/383,425, 61 pages.
Phaujdar, "Understanding Event Streams—A Comprehensive Guide 101_ Learn Hevo" [https://hevodata.com/learn/understanding-event-streams/] (Feb. 17, 2021) (Year: 2021).
Dhanushka, "Understanding Kafka Topic Partitions" [https://medium.com/event-driven-utopia/understanding-kafka-topic-partitions-ae40f80552e8] —(Mar. 28, 2021) (Year: 2021).
Splunk, "Comparing Pulsar and Kafka" [https://www.splunk.com/en_us/blog/it/comparing-pulsar-and-kafka-how-a-segment-based-architecture-delivers-better-performance-scalability-and-resilience.html] —(Dec. 5, 2017) (Year: 2017).
Office Action dated Sep. 30, 2022 for U.S. Appl. No. 17/408,344, 66 pages.
Office Action dated Oct. 27, 2022 for U.S. Appl. No. 17/063,906, 59 pages.

\* cited by examiner

EMPLOYING TRIGGERED RETENTION IN AN ORDERED EVENT STREAM STORAGE SYSTEM

TECHNICAL FIELD

The disclosed subject matter relates to data storage and, more particularly, to retaining an event of an ordered event stream of a stream data storage system.

BACKGROUND

Conventional data storage techniques can employ an event stream, e.g., storing data corresponding to stream events in a logical order. In a conventional system, an event stream can provide for storing a generally unbounded stream of events whereby a portion of the stored events can then be read out in the order they were stored. One use of data storage is in bulk data storage. Retention of an event stored via an event stream storage system can be desirable, for example, to ensure that event data is not deleted prior to a prescribed progress point.

DETAILED DESCRIPTION

Figure 1:
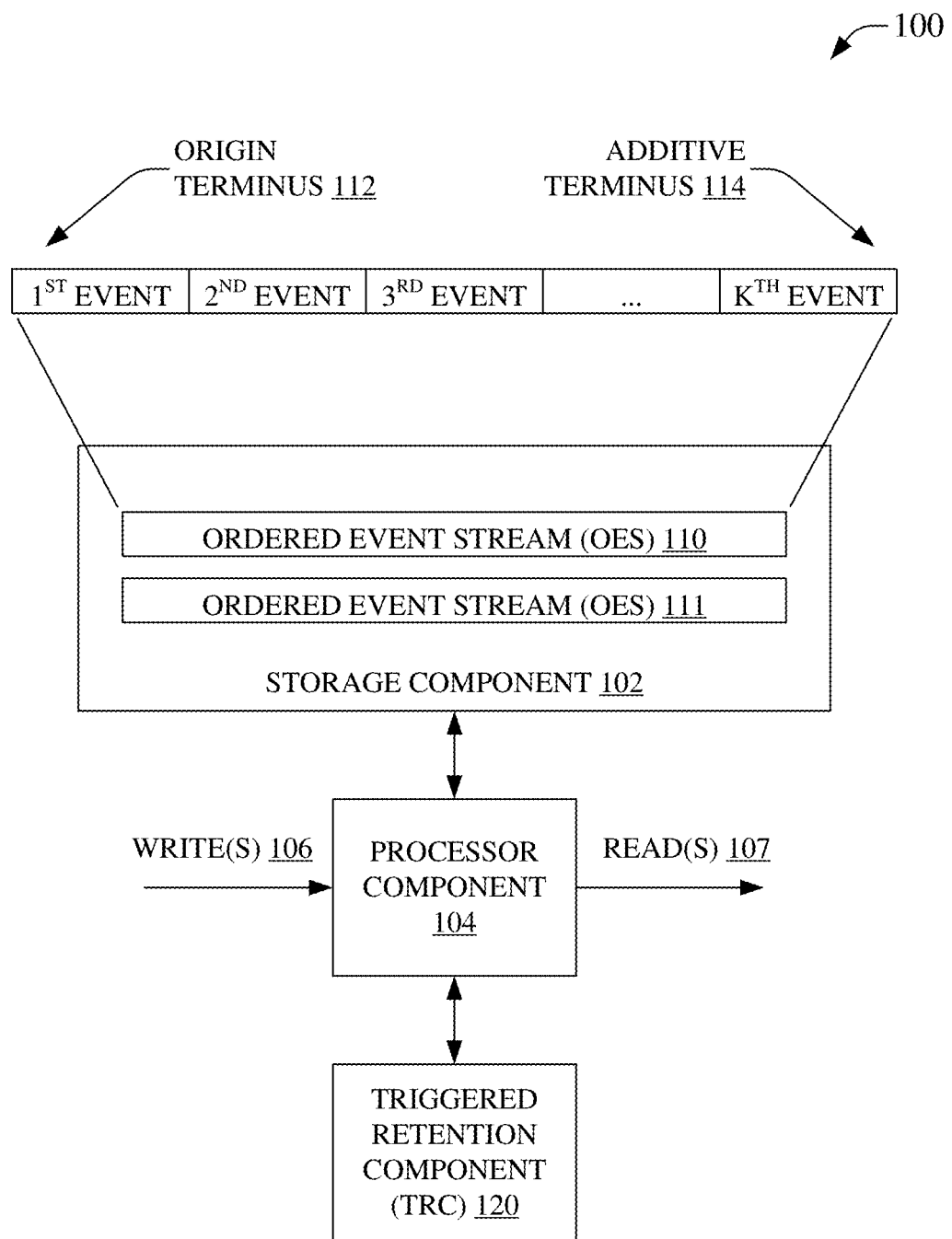
FIG. 1 is an illustration of an example system that can facilitate retention of an event of a segment of an ordered event stream, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As mentioned, conventional event stream storage techniques, for example, can result in storage of many events objects in a stream. This can result in storing events for an extended period of time. Accordingly it can be desirable to delete older events to free up storage space. However, conventional streams can be rudimentary, for example simply deleting events older than a default date, time, etc. In some situations, the conventional rudimentary freeing of space can be problematic, e.g., can result in deletion of events that should have been retained despite being older than a default date, time, etc.

The instant disclosure enables retention of an event based on a retention policy related to a 'trigger,' e.g., an occurrence that can trigger activation of a retention window. As an example, consider an ordered event stream (OES) that stores events corresponding to sensor readings from an airplane engine. This example OES can rapidly become populated with a great number of events during a flight. However, in this example, simply deleting events older than two days can be problematic. Where the example airplane successfully lands after the flight, there it can be acceptable to soon after delete events for the completed flight, e.g., deleting events older than two days, etc., however, where the airplane fails to complete the flight successfully, for example the plane crashes when landing, allowing the OES to cull stored events older than two days can result in the loss of potentially critical engine measurements prior to the completion of a crash investigation. As such, a trigger, for example a successful landing of the plane, can cause activation of a retention window, for example a two-day retention window. In this example, where the plane successfully lands, the trigger can start the two-day retention window that can allow for deletion of events more than two days older than the successful landing trigger. However, in this example, where the plane does not successfully land and the trigger does not therefore occur, the retention window would not be activated and the events would be retained. In an aspect, writing of an event can be a trigger, e.g., where the example plane lands and this causes writing of an event at a 'successful landing' key space of an OES, then this can be a trigger to begin the triggered retention window. In another aspect, a trigger can be manually entered, for example, an administrator or user can indicate a trigger occurrence, e.g., a pilot can indicate a successful landing of the plane in the above example, which can act to trigger the start of the triggered retention window. In a further aspect, a trigger can be caused by the system itself, for example, an OES can be instructed to trigger a triggered retention window after writing each 50000 events, such as, at 50000 events, 100000 events, 150000 events, . . . , 500000 events, etc., an example OES can trigger corresponding triggered retention windows of older events to allow for their eventual deletion, e.g., as a form of clean-up, garbage collection, etc.

In an aspect, there can be a triggered retention window. Moreover, there can also be a fixed retention window. In an aspect, the fixed retention window can act to provide a minimum retention period. As an example, a triggered retention window can be a 24-hour retention and a fixed retention window can be a 48-hour window. In this example, where an event is recorded, the fixed retention window can be activated. Moreover, the triggered retention window can be activated in response to an occurrence of a corresponding trigger. Using these values in conjunction with the prior plane engine OES example, when the plane begins an example six-hour flight, events can be recorded and the fixed retention window can be activated upon the events being written to the OES. The plane can then successfully land six hours later, which can trigger the triggered retention window for the events recorded during the flight. In this example, the 24-hour triggered retention period will end at 30 hours after the start of the flight, e.g., at 24 hours plus the 6 hours for the flight. It can be noted that the fixed retention window has not yet elapsed at the 30-hour mark. As such, even though the example triggered retention window has completed, the events can be retained until the fixed retention window also elapses, e.g., at 48 hours after each event was written. This can result in the last of the events for the example flight being allowed to be deleted at 54 hours because the last event for this flight would have been written at landing, e.g., at +6 hours from takeoff of the plane, and then an additional 48-hour fixed window would need to elapse. Retention of events subject to one or more retention policies comprising at least one triggered retention policy are typically beyond the capabilities of conventional retention management technology. As such, the disclosed subject matter can typically assure that stream data, e.g., an event(s), is retained until all retention rules are determined to have been satisfied, wherein the retention rules reflect one or more triggered retention window/policy.

In general, an OES, or a stream for convenience, can be a durable, elastic, append-only, unbounded sequence of events. An example of an ordered event streaming storage system can be STREAMING DATA PLATFORM by DELL EMC. An event can be added to a head of a stream of events, e.g., a first event can be considered at a tail of an event stream and a most recent event can be regarded as being at the head of the stream with other events ordered between the tail and the head of the stream. The events need not be stored in contiguous storage locations to be logically sequenced in the stream representation, e.g., a first event can be stored on a first disk, a second event on a remotely located second disk, and a third event stored at a further remote third disk, the stream can logically sequence the first, second, and third events by reference to their stored data in different physical locations, the OES can be regarded as an abstraction comprising the events in an ordered manner. It is noted that some stream systems, e.g., PRAVEGA by DELL EMC, etc., can employ an inverted head/tail terminology, for example, in PRAVEGA a first event can be added at a head of an OES, while subsequent new events can then be added to a tail of the OES, however, this is indistinguishable in all other aspects from the head/tail convention generally employed in the instant disclosure. Every event of the stream can be associated with a routing key, or simply key for convenience. A key can often be derived from data of the event, e.g., a "machine-id," "location," "device type," "customer number," "vehicle identifier," etc. In an aspect, an event can be associated with a key, however, data yet to be written to an event can be associated with a access target value that can be the same value as the key, e.g., the access target value can be determined based on the data of the event, a characteristic corresponding to the event to be recorded, etc., such that the access target value can be regarded to be the same as the key. Accordingly, the term event key, hashed key value, access target value, key, etc., can be used interchangeably for convenience unless the context indicates a more specific use, for example, a access target value can correspond to data to be stored in an event and can be derived from that data or other characteristics corresponding to the data such that when the event is stored the access target value can be used as the key associated with storing the event. Similarly, in a read operation, an access target value can be indicated to allow access to an event having a key that matches the access target value because the event was written to the OES according to a key that can be the same as the access target value. Generally speaking, the term access target value can relate to a "key's" value such that access to events of an OES can be based on comparing the access target value to key values for actual stored events, where an existing event is to be read, or key values that will be used to store an event, where an event will be written into the OES at the access target value. Again, it is generally easier to just use the term key for both access target value and routing key unless more specificity is needed in some given example, and this convention is generally used in the instant disclosure for simplicity and brevity. Events with the same routing key can be written to a corresponding stream or stream segment, and can also be consumed, e.g., read, in the order they were written to the stream or stream segment.

In an aspect, an OES can comprise one or more stream segments. A segment of an event stream can generally be associated with a single processing instance to assure ordering of the events logically added to the segment. A processing instance can be a single real physical processor, a virtualized processor executing on one or more real physical processors, a group of real physical processors, a group pf virtual processors executing on one or more real physical processors, etc. As an example, a processing instance can be a blade server of a rack system. As another example, a processing instance can be a virtual processor deployed in an elastic computing system, e.g., a 'cloud server,' etc. Typically the processing instance can be associated with a level of performance which, in some embodiments, can be measured via one or more key performance indicators (KPIs) for the processing instance. As an example, a first blade server of a rack can have a first level of performance and a second blade server of a rack can have a second level of performance. In this example, where the two blade servers can comprise similar hardware and environments, they can have similar levels of performance. However, also in this example, where the two blade servers comprise different hardware and/or are in different environments, they can have different, sometimes substantially different, levels of performance. As an example, a first processing instance can perform one unit of work, a second processing instance can perform one unit of work, a third processing instance can perform five units of work, a fourth processing instances can perform three units of work, etc., where the unit of work can correspond to a number of event stream operations that can be performed per unit time by the processing instances, e.g., reads, writes, etc. In this example, the first and second processing instances can perform similar amounts of work in an event stream storage system, while the third processing instance can be capable of up to five times the work of either the first or second processing instance. Generally, the computing resources of a processing instance can be associated with costs, e.g., monetary costs, electrical consumption costs, dispersion of generated heat costs, support or manpower costs, real estate for deployment costs, etc. As such, selecting an appropriate processing instance can be associated with optimizing cost(s). As an example, if an event stream consumes less than one unit of work, then pairing the stream with a processing instance that can perform one unit of work can be a more optimal use of computing resources, e.g., lower overall aggregate costs, etc., than pairing the event stream with a processing instance that can perform 200 units of work which can result in 'wasting' up to 199 units of work through underutilization. Moreover, in this example, the 200 unit processing instance, for example, can be a newer high end processing instance that can have a high monetary cost, and generate more heat than the one unit processing instance that, for example, can be a low cost commodity processing instance that is plentiful, has a low monetary cost, and is already widely deployed. As such, paring the one unit of work event stream with a race car of a performance instance can be understood as possibly not being an optimal pairing in comparison to a more pedestrian performance instance.

Where an OES can be comprised of one or more portions, e.g., segments, shards, partitions, pieces, etc., that can generally be referred to as segments for convenience, a segment of an OES can act as a logical container for one or more events within the OES. When a new event is written to a stream, it can be stored to a segment of the stream based on a corresponding event routing key. An event routing key can be hashed with other event routing keys to form a "key space". The key space can be employed to 'divide' the stream into a number of parts, e.g., segments. In some embodiments, consistent key hashing can be employed to assign events to appropriate segments. As an example, where a stream comprises only one segment, all events to be written to the stream are written to the same segment in an ordered manner and the segment corresponds to the entire key space. As another example, where a stream comprises two segments, the key space can be associated with the two segments, e.g., the total key space can extend from zero to 'n', however each of the two segments can be associated with a portion of the total key space, for example, the first segment can be employed to store events with a key between zero and 'm' and the second segment can be employed to store events with a key between 'm+1' and 'n'. It will be appreciated that more segments can be employed to further divide the key space such that a segment can store an event with a key falling within the range of the key space associated with that segment. As an example, a four segment OES can have each segment store data for a quarter of the total key space, e.g., segment A can store events with keys from 0 to <0.25, segment B can store events with keys from 0.25 to <0.5, segment C can store events with keys from 0.5 to <0.75, and segment D can store events with keys from 0.75 to 1.0, etc. Other example divisions of the key space in this example, such as asymmetric division of the key space, etc., are readily appreciated and are not further recited for the sake of clarity and brevity.

Moreover, an OES stream can have a topology that evolves. An evolution of an OES topology can be related to different epochs. As an example, an OES can initially have a first segment, but where writing of events increases above a threshold level, the OES can be scaled to comprise two segments, e.g., a second segment and a third segment. In an aspect, each of the second and third segments can employ a separate processor instance to write events, e.g., scaling the OES can correspond to an increase in the count of processors writing events to the OES. Accordingly, a hashed key space can be divided to encompass the second and third segments of the scaled OES, e.g., the example OES can initially have the first segment covering a key space of 0 to 1, and after the scaling, the second segment can cover events from zero up to 0.25 of the key space and the third segment can cover events from 0.25 to 1 of the key space. The example scaling of the OES can constitute an 'epoch change', e.g., evolution of the topology of the OES, such that before the scaling the OES had the first segment in a first epoch, e.g., 'Epoch 1', and, after the scaling, the OES can have a second and third segment in a second epoch, e.g., 'Epoch 2'. In an aspect, the first segment can be closed at the change in epoch, and thereby, the second and third segments can correspondingly be opened at the epoch change. In this way, in Epoch 1 there is one segment for all of the key space zero to one and, in Epoch 2, there are two segments, each covering a portion of the total key space. In an aspect, storage schemes can be different in different epochs, e.g., the topology change of the OES can result in a change in storage scheme. Returning to the above example, reading an event with a key space value of 0.75 in the first epoch can read from the first segment and can be distinct from reading another event with a key space value of 0.75 in the second epoch that would read from the third segment. The use of different storage schemes for events of an OES, e.g., an OES having different OES segment schemes across epochs of an OES, can be associated with reading out OES events according to those different storage schemes in their corresponding epochs.

An OES storage scheme can correspond to a distribution of a hashed key space to segments of an OES. As an example, a first OES storage scheme can have a hashed key space extends from 0 to 1, wherein a first segment can store events having a hashed key value 'y' between 0 and 0.28, e.g., $0 \leq y < 0.28$, and a second segment of the OES can store events having 'y' between 0.28 and 1, e.g., $0.28 \leq y < 1$. The example first OES storage scheme can be altered to a next storage scheme, e.g., advanced to a second epoch, wherein the first and second segment can be closed and a third and fourth segment can be opened wherein third segment can store events having a hashed key value 'y' between 0 and 0.7, e.g., $0 \leq y < 0.7$, and the fourth segment of the OES can store events having 'y' between 0.7 and 1, e.g., $0.7 \leq y < 1$. Moreover, the second epoch can end when a third epoch is begun that represents a third OES storage scheme, for example, closing the third and fourth segments and opening fifth through seventh segments, wherein the fifth segment can store events having a hashed key value 'y' between 0 and 0.1, e.g., $0 \leq y < 0.1$, the sixth segment can store can store events having 'y' between 0.1 and 0.5, e.g., e.g., $0.1 \leq y < 0.5$, and the seventh segment can store can store events having 'y' between 0.5 and 1, e.g., $0.5 \leq y < 1$.

Generally, changes to an OES storage scheme, e.g., an epoch change, etc., can be in response to an indication that computing resources transition a level of burden, e.g., where a processor becomes burdened, another processor can be added and the key space can be divided between increased number of processors according to a new epoch. An event stream can be divided, symmetrically or asymmetrically, to increase an amount of computing resources available to each segment of an OES. As an example, if an initial event stream causes a load of two units of work for a first processor, and the two units of work load correspond to an even distribution of work across the associated key space of the initial event stream, and the two units of work can exceed a threshold work level of the example first processor, then the stream can be split into two segments and a second processor can be added. In this example, after the scaling of the stream, the first processor can now support a second segment, in lieu of the initial one segment, at about one unit of work and a third segment can be supported by the second processor, also at about one unit of work, assuming the work load from the initial stream was roughly evenly split between the key spaces of the new epoch.

Transitions between OES epochs, e.g., changing OES storage schemes can be related to changing write and read demands associated with a stream of data. As an example, writing ride share service events to an OES can be according to OES segments that can divide the hashed key space into regions, e.g., a west region, a central region, and an east region. In this example, as peak demand for ride share services can be associated with the time zones, for example being busier in the east zone at local 5 pm than in the west zone that would be at a local time of 2 pm. A such, there can be more demand, in this example, to write data to the OES segment corresponding to the east region and the storage scheme can meet this demand by scaling the OES segment to allow more east region data to be written, e.g., splitting the example OES segment to more segments to allow engaging more processors, which, in some embodiments, can increase the hashed key space related to the now plural OES segments for east region event writing. Moreover, as time continues, demand can increase in the west region and wane in the east region, for example 5 pm in the west can be 8 pm in the east. As such, the east region segments can be scaled down and the west region segments can be scaled up, e.g., effectively shifting processing power to storage of west region events rather than east region events. The change in scaling of the segments of the OES can be associated with a change in storage scheme and a change in OES storage epochs, etc.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate retention of an event of a segment of an ordered event stream, in accordance with aspects of the subject disclosure. System 100 can comprise a storage component 102 that can store an ordered event stream (OES) 110, 111, etc., which can store representations of, reference to, etc., one or more events. An OES can store one or more events. An event can be associated with a key, e.g., a routing key. A key can typically be determined from aspects or characteristics of, or corresponding to, an event, although other key determination techniques can be employed. As an example, a key can be based on a characteristic of the source of the event data, such as a customer identifier, machine identifier, a location of a device providing the event data, a type of a device providing the event data, etc. Events can be written to an OES in an ordered manner according to a key, e.g., events with a same key can be written to a same portion, e.g., segment, etc., of an OES in an ordered manner. Similarly, events can be read from an OES, generally in an ordered manner, according to a key, e.g., typically in the order in which they were previously written into a portion of an OES. Components providing data for events to be written can be termed 'writers,' e.g., a writer application instance, etc., and components requesting data from events can be termed 'readers,' e.g., a reader application instance, etc. As such, a writer can provide data for an event that can be written to a portion of an OES, e.g., OES 110, 111, etc., in an ordered manner based on a key associated with the event. Similarly, a reader can receive data from an event stored in a portion of an OES, e.g., OES 110, 111, etc., based on a key.

Processor component 104 of a system 100 can receive write(s) 106 that can be written to OES 110, 111, etc., to be stored via storage component 102. Processor component 104 of a system 100 can provide access to events based on a key, e.g., as read(s) 107 that can be communicated to a reader. Generally, one processing instance, e.g., processor component 104, etc., can be designated for writing events to a portion, e.g., segment, of OES 110, 111, etc. OES 110, 111, etc., can comprise one segment and/or parallel segments that can store events according to a key. In an aspect, more than one processing instance writing to a segment of an OES, while allowable in some embodiments, is typically disfavored because it can increase the difficulty of writing incoming events in a properly ordered manner. However, a given processing instance can read, write, etc., to more than one OES segment, e.g., a given processing instance can write to one or more OESs, to one or more segments of one OES, to one or more segments of one or more OESs, etc. Generally, for a given number of segments there can typically be up to the same number of processing instances. Although adding more processing instances is allowable, these additional processing instances are generally idle to avoid possible scrambling of an order of events being written to a segment. It is further noted that idle processing instances, where comprised in system 100, for example, can act as reserve processing instances, such as to allow for failover where an active processing instance becomes less responsive, etc. In an aspect, keys of one or more segments of an OES can represent a key space for OES 110, 111, etc. Segments can therefore act as logical containers associated with a particular range of keys for an event stream and can be used to store events within an OES. When a new event is written to a stream, it can be stored to one of the segments based on the event key. In an aspect, the key space can be divided into a number of ranges that can correspond to the number of segments comprising an OES. As an example, a key space for an OES can be from 0 to 100, the OES can comprise two parallel segments wherein the first segment sequentially stores events with, for example, keys from 0 to 30 and the second segment sequentially stores events with keys from >30 to 100. In this example, a first event with a key of 54 can be appended to the second segment, a second event with a key of 29 can be appended to the first segment, a third event with a key of 14 can be further appended to the first segment after the second event, etc.

OES 110, as illustrated in system 100, can be a simplistic example of an OES that can comprise just one segment for storing incoming event write(s) 106 and sourcing event read(s) 107, and therefore the key space of OES 110 can be embodied in an example single segment of events that can have an origin terminus 112. A first event can be written at origin terminus 112. Subsequent events can then be appended at an additive terminus 114 that is typically always at the head of the stream of written ordered events, e.g., a most recent event is written to the head of example OES 110, which can provide ordering of the events being written. This can result in example OES 110 allowing for continuous and unbounded data storage that can be a durable, elastic, append-only, unbounded sequence of events. As an example, a $(K+1)^{th}$ event can be appended to the $K^{th}$ event of example OES 110 at additive terminus 114. In an aspect, storage component 102 can store any number of OESs, e.g., OES 110, 111, etc. Moreover, any one OES can comprise any number of parallel segments, e.g., strings of events for a defined key space range. Each segment can comprise an ordered sequence of stored events. The key space of an OES can evolve, e.g., through different epochs, to comprise different numbers of OES segments as is disclosed elsewhere herein. The key space can be symmetrically or asymmetrically divided and can be, but is not required to be, contiguous.

In system 100, triggered retention component (TRC) 120 can facilitate retention of events based on activation of a triggered event retention window for events of a segment(s) of an OES(s). In an aspect, TRC 120 can determine if a trigger has occurred with respect to an event, batch of events, or other container comprising event or batch of events. As an example, a system can comprise a scope, that can comprise a stream, that can comprise a segment, that can comprise an event, whereby, in this example, TRC 120 can determine if a trigger has occurred at the event-level, segment-level, stream-level, scope-level, system-level, etc., to enable retention of a corresponding scope, stream, segment, event, etc. In the following disclosure, retention can be first discussed at the event-level, e.g., retention of events on an event-by-event basis. However, event-level retention management, while enabled herein, can be overly fine grained in regard to simply recovering storage space by allowing for deletion of events that need not be further retained and, as such, the concept of retention can be secondarily discussed in terms of batches of events, segments, streams, scopes, etc., e.g., permitting or withholding the deletion of groups of events, groups of segments, groups of streams, groups of scopes, etc., wherein it can be appreciated that these more coarse grains can be substituted for the fine grain events. As such, first looking at event retention, writing an event can be associated with a retention period.

In an aspect, a triggered retention window can be employed. The triggered retention window can be in addition to a fixed retention window. In an aspect, a fixed retention window can act as a minimum event retention window, which typically can be in terms of time, date, counts, or other progress metrics, e.g., an event can be stored for at least one day, one week, until 100 widgets have been manufactured, for 1300 rotations of a shaft, etc. The fixed retention window can be of one or more values, e.g., a first fixed window for a first event can be of the same or different value than a second fixed window of a second event. However, while the fixed value need not be static, it can be contrasted with a triggered retention window that can remain inactive until it is triggered by a trigger occurrence. An example of a trigger retention window can be to retain an event for one month after a restart of a device, wherein the restart of the device can be said to trigger the one month triggered retention window. In this example, the one month triggered retention window will not become active until there is a restart of the device and this triggered activation can distinguish a triggered retention window from a fixed retention window.

In some embodiments, there can be more than one triggered retention window, e.g., more than one triggered retention policy may need to be satisfied to allow an event to be deleted from an OES. Moreover, in some embodiments, negative trigger conditions can be employed in defining a triggered retention window, e.g., the retention window can be active while a trigger has not occurred. In this example, where a trigger occurs, the triggered retention window can be restarted, can be paused, etc. As an example of a negative trigger policy, a triggered retention window can be active while an error condition is not indicated, allowing data to be deleted where the triggered retention window expires prior to an error condition being indicated. However, in one permutation of this example, where an error is indicated, the triggered retention window can be paused, e.g., can require an administrator to clear the error flag and restart the triggered retention window, etc. In another permutation of this example, the indication of the error can cause the triggered retention window to restart, thereby delaying any deletion of corresponding events, and then again advance towards expiration while another error is not indicated.

In some embodiments, combinations of at least one triggered retention policy, either affirmative or negative, with one or more fixed retention policy are allowable, e.g., a negative triggered retention window and two fixed retention windows can be combined to manage retention of one or more events of one or more segments of one or more streams of one or more scopes . . . of one or more systems, without departing from the scope of the disclosed subject matter. Generally, the discussion of the disclosed subject matter is in the context of affirmative triggers for the sake of clarity and brevity, although all negative triggers, affirmative triggers, and combinations of one or more of these with one or more fixed retention policies is considered expressly within the scope of the presently disclosed subject matter.

In an aspect, TRC 220, as stated, can determine if a trigger has occurred with respect to an event and that the corresponding triggered retention window has elapsed, and can signal processor component 204 to enable deletion of an event from a segment of an OES. It is noted that other restrictions on deleting an event, retention policy(ies), etc., should also typically be satisfied before an event(s) can be allowed to be deleted. It is further noted that deletion of an event can correspond to releasing an area of physical data storage from being related to the event in an OES, e.g., the actual data may not be actually removed from storage, but rather, the relation between the stored data and representation in the OES can be released. However, in some embodiments, deleting an event can be associated with overwriting the event data, etc. TRC 220 can, in some embodiments, determine batches of events that can be deleted were retention management occurs at levels other than an event-level retention management schema. Moreover, TRC 220 can merge retention various policies corresponding to events of a batch of events to enable appropriate retention for the batch of event. In some embodiments, merging retention policies can be embodied via sequential application of one or more retention policies, wherein the order of application can be determined by TRC 220.

Figure 2:
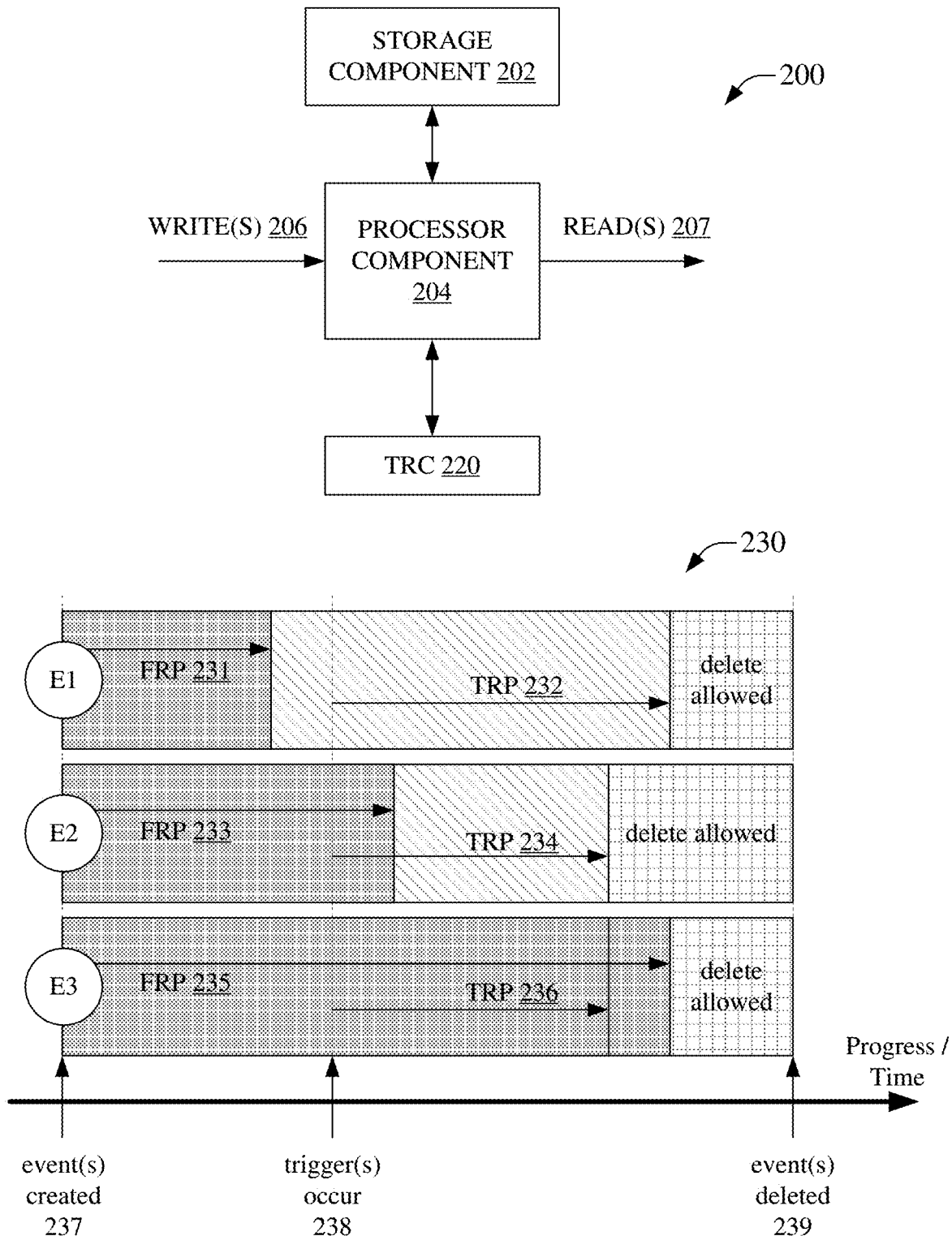
FIG. 2 is an illustration of an example system enabling retention of an event according to a fixed retention policy and triggered retention policy, in accordance with aspects of the subject disclosure.

FIG. 2 is an illustration of an example system 200 enabling retention of an event according to a triggered retention policy and fixed retention policy, in accordance with aspects of the subject disclosure. System 200 can comprise a storage component 202 that can store an OES that can store one or more events according to a routing key that can be determined from aspects of the event. Events can be written to an OES in an ordered manner, e.g., via write(s) 206, and can be read from the OES in an ordered manner, e.g., via read(s) 207. In an aspect, keys of one or more segments of an OES can represent a key space. Segments can therefore act as logical containers associated with a particular range of keys for an event stream and can be used to store events within an OES.

In system 200, triggered retention component (TRC) 220 can facilitate retention of events based on activation of a triggered event retention window for events of a segment(s) of an OES(s). In an aspect, TRC 220 can determine if a trigger has occurred with respect to an event, batch of events, or other container comprising event or batch of events. Example illustration 230 can depict some aspects of retention policies in an OES at the event-level.

In illustration 230, at 237, example event E1 can be written to a first OES. At the writing of E1, a fixed retention window can begin, e.g., of progress size indicated by the arrow for fixed retention period (FRP) 231. In this example, FRP 231 can elapse prior to a trigger of a triggered retention window occurring for event E1. Whereas the example triggered retention window has not elapsed for event E1, TRC 220 can indicate that deletion of event E1 is not permitted. At 238, a trigger can occur for the example triggered retention window relating to event E1. This can activate the example triggered retention window, which can elapse at a future progress point indicated at the head of the arrow representing the progress size of triggered retention period (TRP) 232. Where example FRP 231 and example TRP 232 have elapsed, event E1 can be permitted to be deleted, which can be indicated via TRC 220. Accordingly, in this example, event E1 can be deleted, e.g., freed, released, overwritten, etc., at event(s) deleted 239.

Illustration 230 illustrates another scenario in relation to event E2, which can be written at 237 to a second OES. Similar to the writing of E1, a fixed retention window can begin in relation to event E2, e.g., FRP 233. In this example, FRP 233 can elapse at a later progress point than the trigger occurring at 238, which can trigger the illustrated triggered retention window for event E2, e.g., via TRP 234. As can be observed, both FRP 233 and TRP 234 can be active and progress to their corresponding terminal progress points. In this example, FRP 233 can be seen to elapse prior to the elapsing of TRP 234 and, as such, event E2 can be retained until at least the elapsing of TRP 234. Accordingly, event E2 can be permitted to be deleted, which can be indicated via TRC 220, at 239 where both FRP 233 and TRP 234 have elapsed.

Further in illustration 230, an additional scenario corresponding to event E3 can be illustrated. Event E3 can be written at 237 to a third OES. Again similar to the writing of E1 and E2, a fixed retention window can begin in relation to event E3, e.g., FRP 235. As before, at 238, TRP 236 can be triggered. In this example, TRP 236 can elapse before FRP 235, e.g., the fixed retention can elapse at a later progress point than the elapsing of the triggered retention window related to TRP 236. As such, even where TRP 236 has elapsed, event E3 should be retained, as can be indicated by TRC 220, until FRP 235 also elapses. As in relation to event E2, for the example of event E3, both FRP 235 and TRP 236 can be active simultaneously and can independently progress to their corresponding terminal progress points. Accordingly, event E3 can be permitted to be deleted, which can be indicated via TRC 220, at 239 where both FRP 235 and TRP 236 have elapsed.

Figure 3:
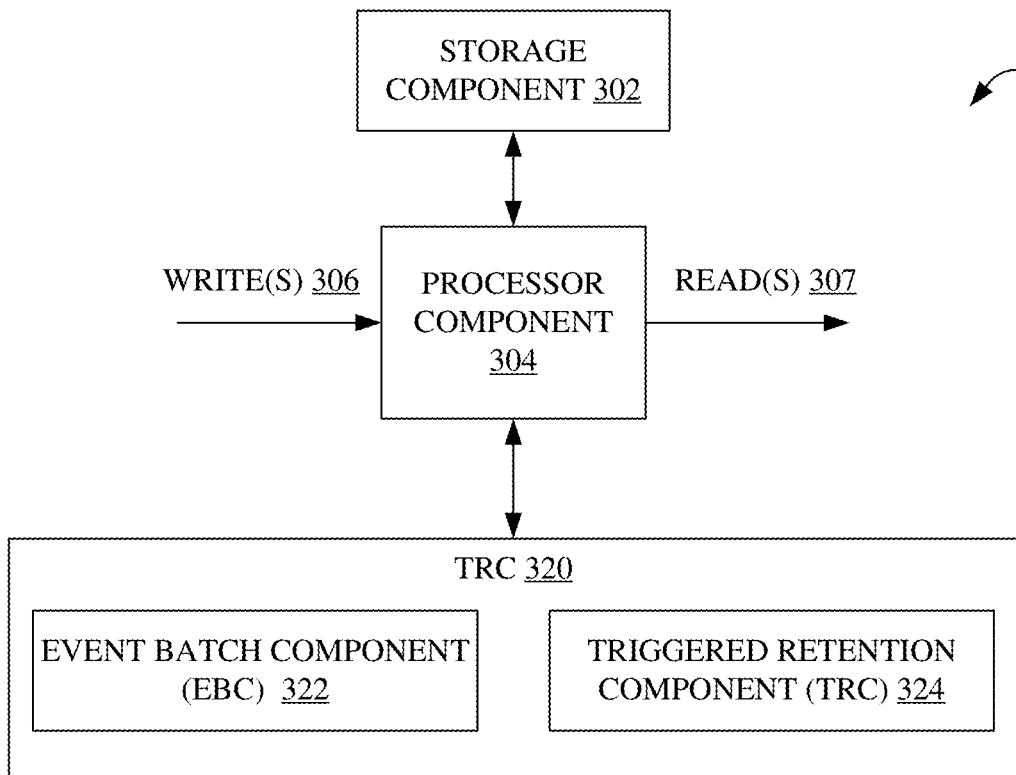
FIG. 3 illustrates an example system that can enable retention of a batch of events of an ordered event stream, in accordance with aspects of the subject disclosure.
Figure 3:
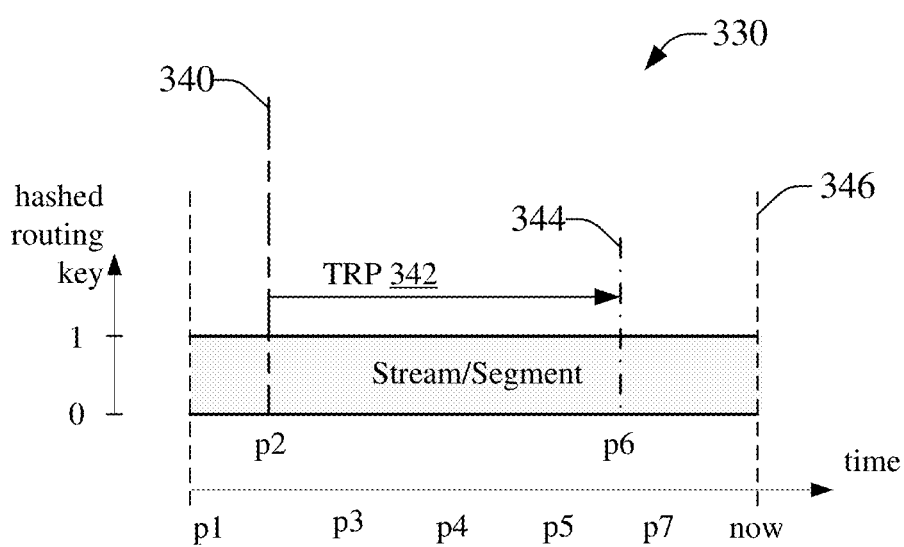

FIG. 3 is an illustration of a system 300, which can facilitate retention of a batch of events of an ordered event stream, in accordance with aspects of the subject disclosure. System 300 can comprise a storage component 302 that can store an OES that can store one or more events according to a routing key that can be determined from aspects of the event. Events can be written to an OES in an ordered manner, e.g., via write(s) 306, and can be read from the OES in an ordered manner, e.g., via read(s) 307. In an aspect, keys of one or more segments of an OES can represent a key space. Segments can therefore act as logical containers associated with a particular range of keys for an event stream and can be used to store events within an OES.

In system 300, triggered retention component (TRC) 320 can facilitate retention of events based on activation of a triggered event retention window for events of a segment(s) of an OES(s). In an aspect, TRC 320 can determine if a trigger has occurred with respect to an event, batch of events, or other container comprising event or batch of events, e.g., a segment, a stream, etc. In an aspect, TRC 320 can comprise event batch component (EBC) 322 that can determine a batch of events in relation to a retention policy granularity. As such, where example illustration 330 can depict some aspects of retention policies in an OES at the stream-level, EBC 322 can determine which events are subject to a stream-level retention policy. TRC 320 can comprise retention policy component (RPC) 324 that can determine application of retention policies as a determined level, for example, in example illustration 330, retention policies can be indicated as applicable at the stream-level, e.g., the policies can apply to all event(s) of the stream, e.g., the batch of events comprised in the stream, as compared to at the event-level where the policies can apply to individual events.

Accordingly, in illustration 330, which can depict a single OES comprising a single segment, a batch of events can be all events of the segment up to a given progress point. As an example, where a retention policy is at a segment-level, then the retention policy can be inherited by all the events of that segment. Accordingly, in example illustration 330, where there is only one segment in the OES, the application of a retention policy at any progress point can apply to all events relative to that progress point, for example, where the policy is to retain portions of an OES written less than seven days prior, then all the events of all the segments that comprise the OES and were written more than seven days ago can be subject to deletion because the retention policy is performed at the stream-level, rather than at the segment-level or event-level. The policy can be determined by RPC 324 such that EBC 322 can determine the corresponding batch of events to enable TRC 320 to indicate to processor component 304 a retention state of events stored in storage component 302 based on determining that a retention rule is satisfied.

In example illustration 330, events can typically be written to the stream/segment between p1 and now, and can be understood to continue into the future, e.g., the stream/segment in illustration 330 can be an active stream that continues to store new events, e.g., via write(s) 306 for example. At 346, a stream cut object (SCO) can be received by system 300, indicating that the stream/segment should be truncated at progress point p2, e.g., at 340. This can divest all events of all segments that were written up to progress point p2. However, determining that a retention policy of the stream has been satisfied, e.g., to the batch of events written up to progress point p2, can be performed prior to TRC 320 indicating that this batch of events can be deleted. Accordingly, EBC 322 can determine what events comprise a batch of events up to progress point p2. RPC 324 can determine if at least one triggered retention period, e.g., TRP 342, has elapsed relative to the batch of events determined by EBC 322. In example illustration 330, TRP 342 can elapse at progress point p6, at 344, which can be at a progress point before now, e.g., TRP 342 can be considered elapsed. Accordingly, TRC 320 can indicate that relevant retention window(s) have elapsed, e.g., a retention rule is satisfied, and that the batch of events up to progress point p2 at 340 can be correspondingly ready for deletion. The deletion of the batch of events, e.g., all events of all segments of the stream up to p2 at 340 can reduce the storage space consumed by the OES. This can enable continued writing of new events without needing to continue to expand available storage. Moreover, by batching events, e.g., applying retention at a less granular level, a retention policy did not need to be individually applied to each event, rather the retention policy could be applied to the entire batch of events. It can be appreciated that there can be situations where event-level retention management can be desirable. In these situations, events can be copied, moved, or otherwise manipulated in the key space, for example, to be placed in a different segment of the stream, e.g., via scaling of the stream, to allow the different segment of the stream to employ event-level retention management addressing individual events, while other segments of the stream can be subject to segment-level retention management addressing batches of events. Similar separation of events, segments, streams, scopes, systems, etc., can be performed at other levels of granularity to provide for hierarchical application of retention policies, e.g., at a scope-level events can be batched across different OESs, at a system-level events can be batched across different scopes, at a OES-level events can be batched across different segments, etc. It is noted that example 330, for the sake of clarity and brevity, assumes that all other triggered/fixed retention windows are also determined to have been properly satisfied. As will be appreciated, it is noted that where a fix retention period exceeds the triggered retention period, similar to the condition illustrated for event E3 in FIG. 2, the batch of events can be marked for retention until this fixed period is determined to have elapsed.

Figure 4:
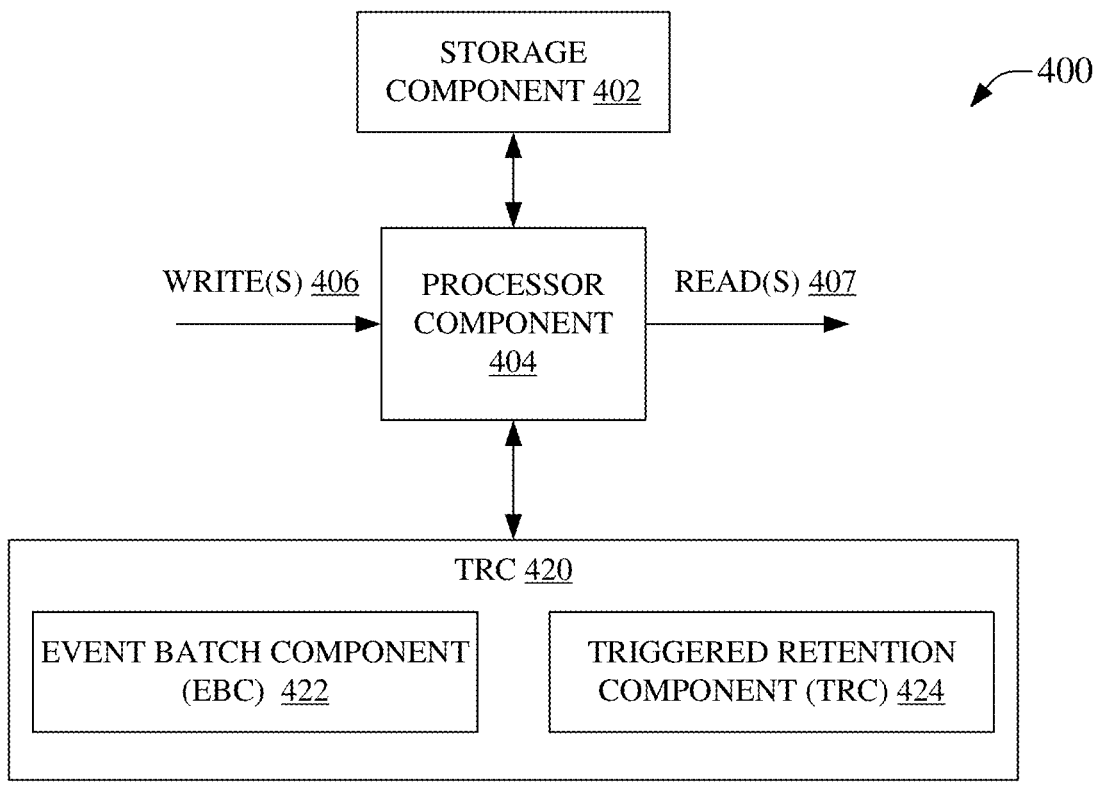
FIG. 4 is an illustration of an example system facilitating retention of one or more batches of events of one or more segments of one or more ordered event streams, in accordance with aspects of the subject disclosure.
Figure 4:
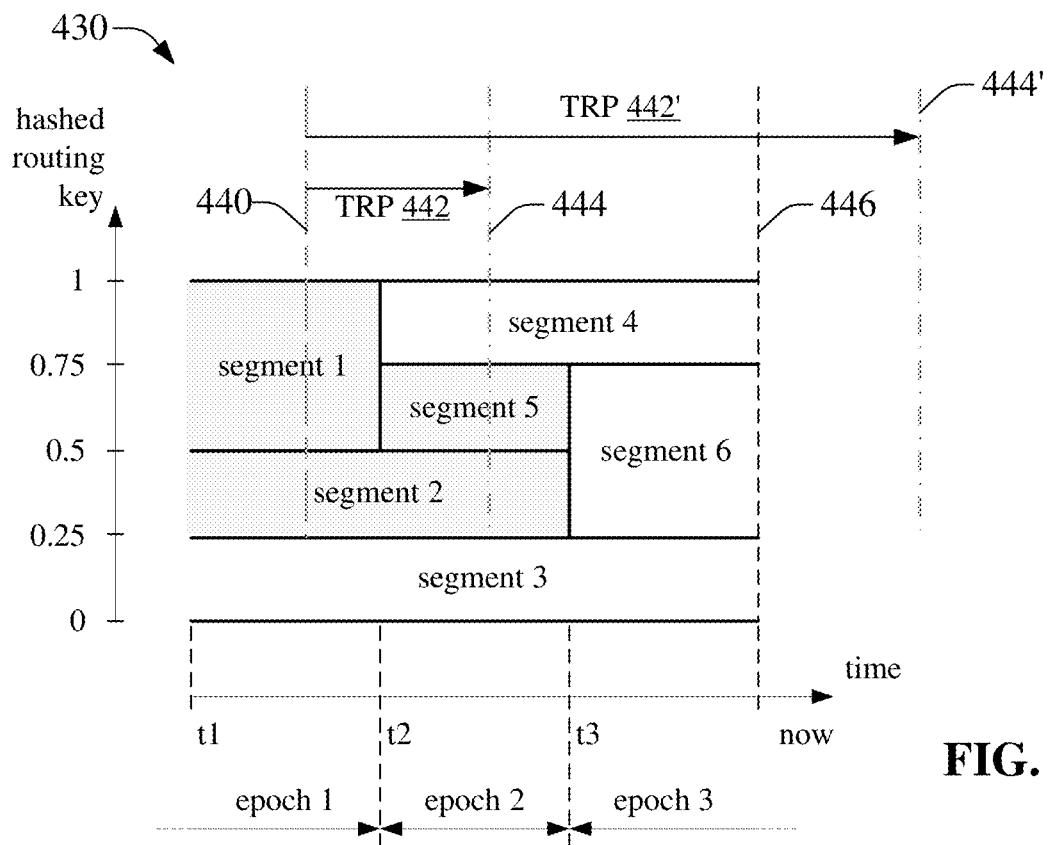

FIG. 4 is an illustration of an example system 400, which can enable retention of one or more batches of events of one or more segments of one or more ordered event streams, in accordance with aspects of the subject disclosure. System 400 can comprise a storage component 402 that can store an OES that can store one or more events according to a routing key that can be determined from aspects of the event. Events can be written to an OES in an ordered manner, e.g., via write(s) 406, and can be read from the OES in an ordered manner, e.g., via read(s) 407. In an aspect, keys of one or more segments of an OES can represent a key space. Segments can therefore act as logical containers associated with a particular range of keys for an event stream and can be used to store events within an OES.

In system 400, triggered retention component (TRC) 420 can facilitate retention of events based on activation of a triggered event retention window for events of a segment(s) of an OES(s). TRC 420 can comprise event batch component (EBC) 422 that can determine a batch of events in relation to a retention policy granularity and retention policy component (RPC) 424 that can determine application of retention policies as a determined level. In an aspect, TRC 420 can determine if a trigger has occurred with respect to an event, batch of events, or other container comprising event or batch of events. Example illustration 430 can depict some aspects of retention policies in an OES at the segment-level. In an aspect, EBC 422 can determine which events are subject to a segment-level retention policy that can be applied via RPC 424. Segment-level retention policies can be indicated as applicable to batches of events comprised in one or more segments of an OES, e.g., the policies can apply to all event(s) of one or more segments of the stream. Illustration 430 can depict a single OES comprising multiple segments across various epochs for an OES. In this example, a batch of events can be all events of one or more of the segments of the OES up to a given progress point. In an aspect, the deletion of batches of events, in some embodiments, can span epochs.

In example illustration 430, events can typically be written to the stream/segment between t1 and now, and can be understood to continue into the future, for example, out to/beyond a time associated with 444', etc. At 446, a stream cut object (SCO) can be received by system 400, indicating that the one or more segments, e.g., segment 1 and segment 2, but not segment 3, should be truncated at progress point at 440. This can lead to eventual deletion of all events in segments 1 and 2 up to 440 but retention of the events of segment 3. Determining that a retention policy for segments 1 and 2 has been satisfied can be performed by RPC 424 prior to TRC 420 indicating that a batch of events for segments 1 and 2, as determined by EBC 422, can be deleted. RPC 424 can determine if at least one triggered retention period, e.g., TRP 442, has elapsed for the batch of all events in segments 1 and 2 as can be determined by EBC 422. In example illustration 430, TRP 442 can elapse at 444, which can be at a progress point before now. Accordingly, TRC 420 can indicate that relevant retention window(s) have elapsed, e.g., a retention rule is satisfied, and that the batch of events for segments 1 and 2 up to 440 can be correspondingly ready for deletion. It is noted that example 430, for the sake of clarity and brevity, assumes that all other triggered/fixed retention windows are also determined to have been properly satisfied.

Also illustrated at 430 is an alternate TRP, e.g., TRP 442'. In contrast to TRP 442 elapsing prior to 446, it can be observed that where an alternate TRP for the batch of events in segments 1 and 2 up to 440, e.g., represented as TRP 442', can elapse after now, e.g., at some point in the future at 444', RPC 424 can determine that the TRP has not elapsed at 446. Accordingly, where the TRP 442' has not elapsed, the batch of events up to 440 in segments 1 and 2 should not be deleted and rather should be retained. TRC 420, in this example, can indicate that the batch of events up to 440 for segments 1 and 2 should be retained, which indication can prevent deletion of the events of segments 1 and 2. In an aspect, a further future request to delete the batch of events up to 440 in segments 1 and 2, where that further future request is received after 444', can result in a determination that TRP 442' has elapsed at the point and deletion would be permitted. As will be appreciated, it is noted that where a fix retention period exceeds the triggered retention period, similar to the condition illustrated for event E3 in FIG. 2, the batch of events can be marked for retention until this fixed period is elapsed.

Figure 5:
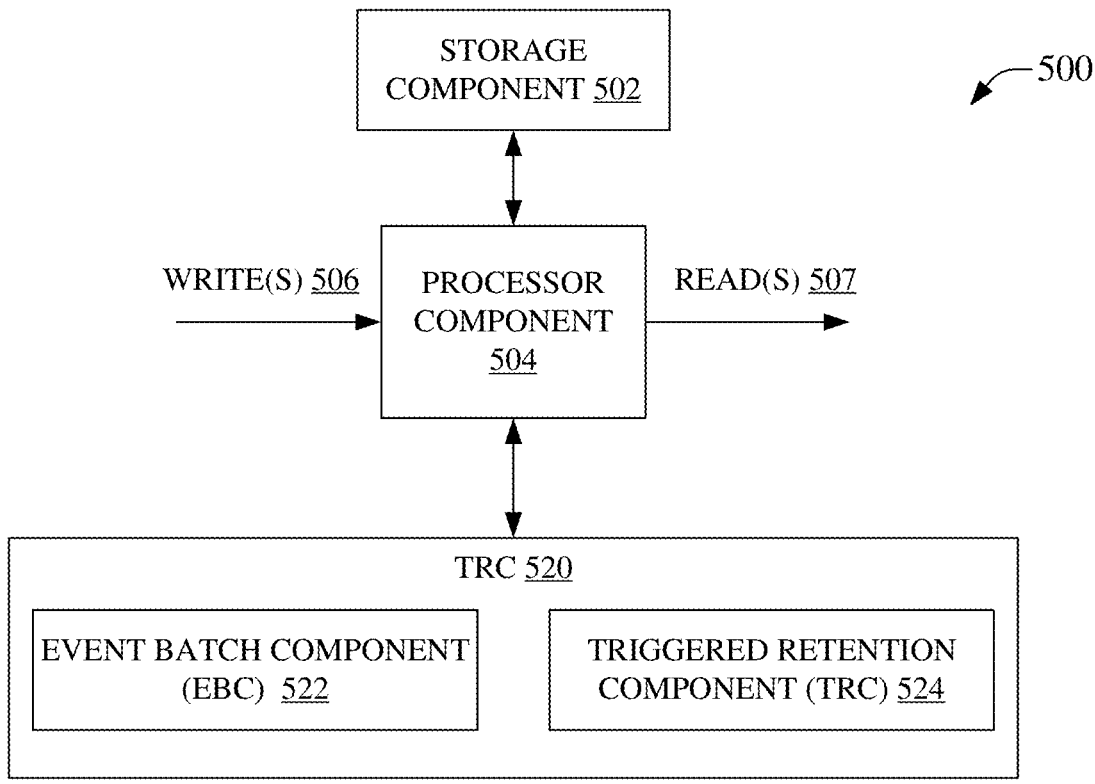
FIG. 5 is an illustration of an example system that can facilitate retention of one or more batches of events of one or more segments of one or more ordered event streams based on retention policies at different progress points, in accordance with aspects of the subject disclosure.
Figure 5:
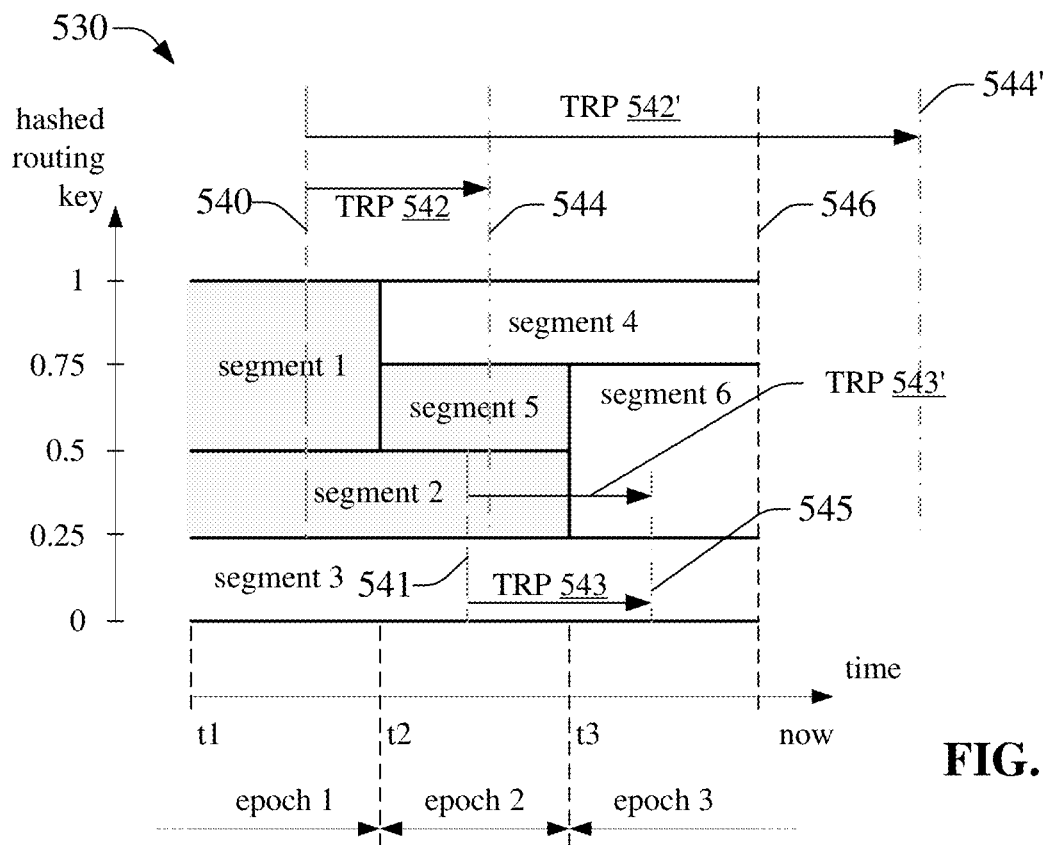

FIG. 5 is an illustration of a system 500 that can facilitate retention of one or more batches of events of one or more segments of one or more ordered event streams based on retention policies at different progress points, in accordance with aspects of the subject disclosure. System 500 can comprise a storage component 502 that can store an OES that can store one or more events according to a routing key that can be determined from aspects of the event. Events can be written to an OES in an ordered manner, e.g., via write(s) 506, and can be read from the OES in an ordered manner, e.g., via read(s) 507. In an aspect, keys of one or more segments of an OES can represent a key space. Segments can therefore act as logical containers associated with a particular range of keys for an event stream and can be used to store events within an OES.

In system 500, triggered retention component (TRC) 520 can facilitate retention of events based on activation of a triggered event retention window for events of a segment(s) of an OES(s). TRC 520 can comprise event batch component (EBC) 522 that can determine a batch of events in relation to a retention policy granularity and retention policy component (RPC) 524 that can determine application of retention policies as a determined level. In an aspect, TRC 520 can determine if a trigger has occurred with respect to an event, batch of events, or other container comprising event or batch of events. Example illustration 530 can depict some aspects of retention policies in an OES at the segment-level. In an aspect, EBC 522 can determine which events are subject to a segment-level retention policy that can be applied via RPC 524. Segment-level retention policies can be indicated as applicable to batches of events comprised in one or more segments of an OES, e.g., the policies can apply to all event(s) of one or more segments of the stream. Illustration 530 can depict a single OES comprising multiple segments across various epochs for an OES. In this example, a batch of events can be all events of one or more of the segments of the OES up to a given progress point. In an aspect, the deletion of batches of events, in some embodiments, can span epochs.

In example illustration 530, events can typically be written to the stream/segment between t1 and now, and can be understood to continue into the future, for example, out to/beyond a time associated with 544', etc. At 546, a stream cut object (SCO) can be received by system 500, indicating that the one or more segments, e.g., segment 1 and segment 2, but not segment 3, should be truncated at progress point at 540. This can lead to eventual deletion of all events in segments 1 and 2 up to 540 but retention of the events of segment 3. Determining that a retention policy for segments 1 and 2 has been satisfied can be performed by RPC 524 prior to TRC 520 indicating that a batch of events for segments 1 and 2, as determined by EBC 522, can be deleted. RPC 524 can determine if at least one triggered retention period, e.g., TRP 542, has elapsed for the batch of all events in segments 1 and 2 as can be determined by EBC 522. In example illustration 530, TRP 542 can elapse at 544, which can be at a progress point before now. Accordingly, TRC 520 can indicate that relevant retention window(s) have elapsed, e.g., a retention rule is satisfied, and that the batch of events for segments 1 and 2 up to 540 can be correspondingly ready for deletion. It is noted that example 530, for the sake of clarity and brevity, assumes that all other triggered/fixed retention windows are also determined to have been properly satisfied up to 540.

Illustration 530 can further illustrate a second SCO received at 546 indicating that the one or more segments, e.g., segment 2 and segment 3, but not segment 4 or segment 5, should be truncated at 541. Where this SCO is processed second to the SCO that truncated at 540, EBC 522 can determine the corresponding batch of events for 541 can be all of the events of segment 3 up to 541 and the events of segment 2 between 540 and 541. RPC 524 can determine that TRP 543 can elapse at 545 which can indicate that by 546, TRP 543 can have elapsed. This can result in TRC 520 indicating the batch of events for 541 can be all of the events of segment 3 up to 541 and the events of segment 2 between 540 and 541 can be deleted.

However, where an alternate TRP, e.g., TRP 542' can be understood to have not elapsed prior to 546, then the SCO to cut events of segments 1 and 2 up to 540 can result in TRC 520 indicating that the events should be retained because the triggered retention period has not elapsed. This alternate TRP for the SCO relative to 540 can complicate the analysis of the SCO relative to 541. It can be appreciated that deletion of segment 2 events up to 541 where TRP 543, e.g., as illustrated by TRP 543', has elapsed can be improper where the events should be retained because TRP 542' has not yet elapsed. Accordingly, RPC 524 can indicate that elapsing TRP 543' is non effectual where TRP 542' has not elapsed, e.g., all other triggered/fixed retention windows are also determined to have NOT been properly satisfied up to 540 Where a future truncation request, e.g., after 544', occurs, it can be noted that TRP 542' and TRP 543' have elapsed and the batch of events to 540 can be indicated as ready for deletion by TRC 520, followed by an indication that the batch of events up to 541 can be ready for deletion. As will be appreciated, it is noted that where a fix retention period exceeds the triggered retention period, similar to the condition illustrated for event E3 in FIG. 2, the batch of events can be marked for retention until this fixed period is elapsed.

In an aspect, events of a segment can be employed as triggers for SCOs. As an example, an event in segment 3 at 546 can be regarded as triggering TRP 542, TRP 542', TRP 543, TRP 543', etc. Moreover, for example where SCOs are automatically generated periodically, there can be an operation that can trigger SCOs from an earliest SCO that has not elapsed to a most current SCO.

Figure 6:
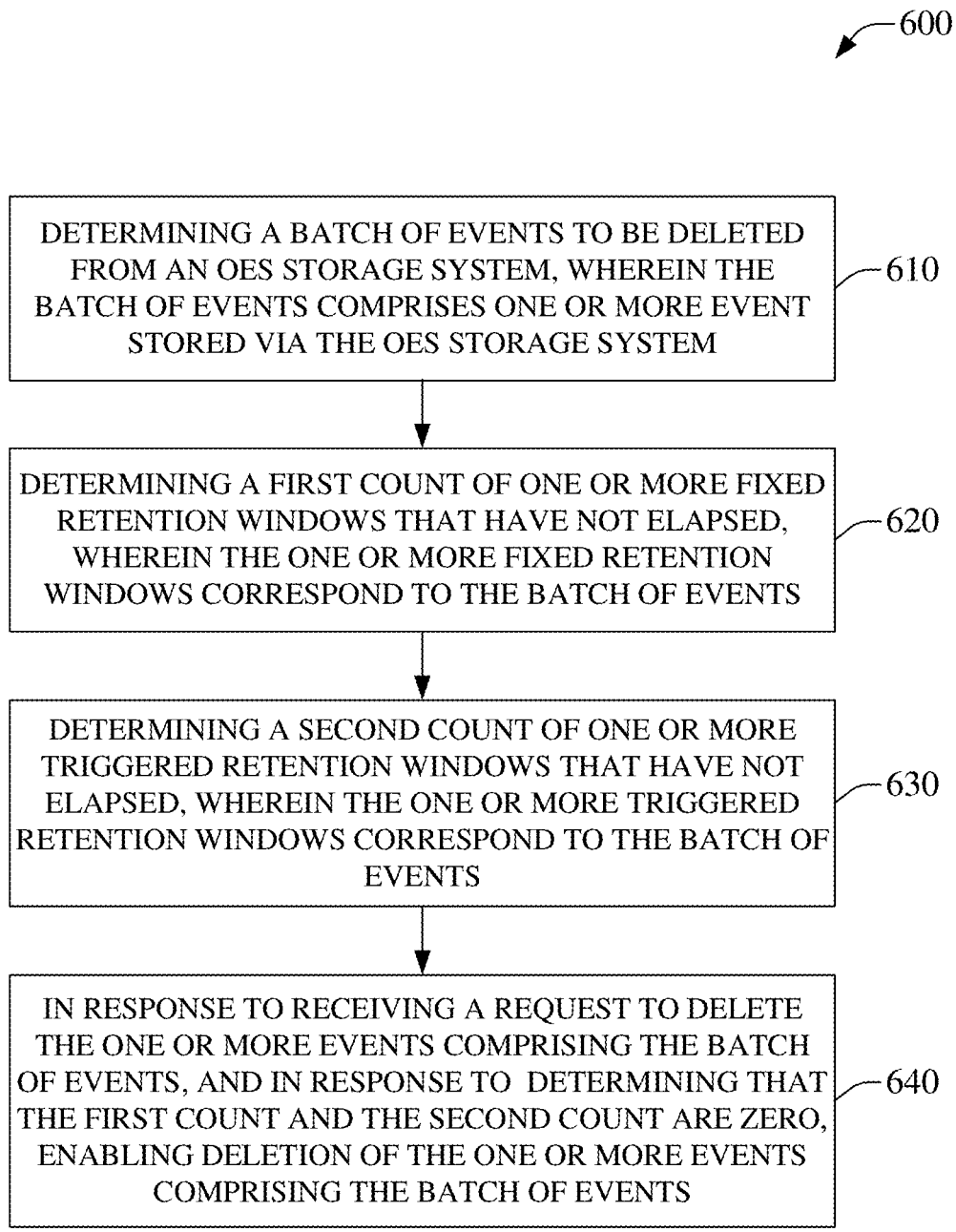
FIG. 6 is an illustration of an example method enabling retention of an event of a segment of an ordered event stream, in accordance with aspects of the subject disclosure.
Figure 7:
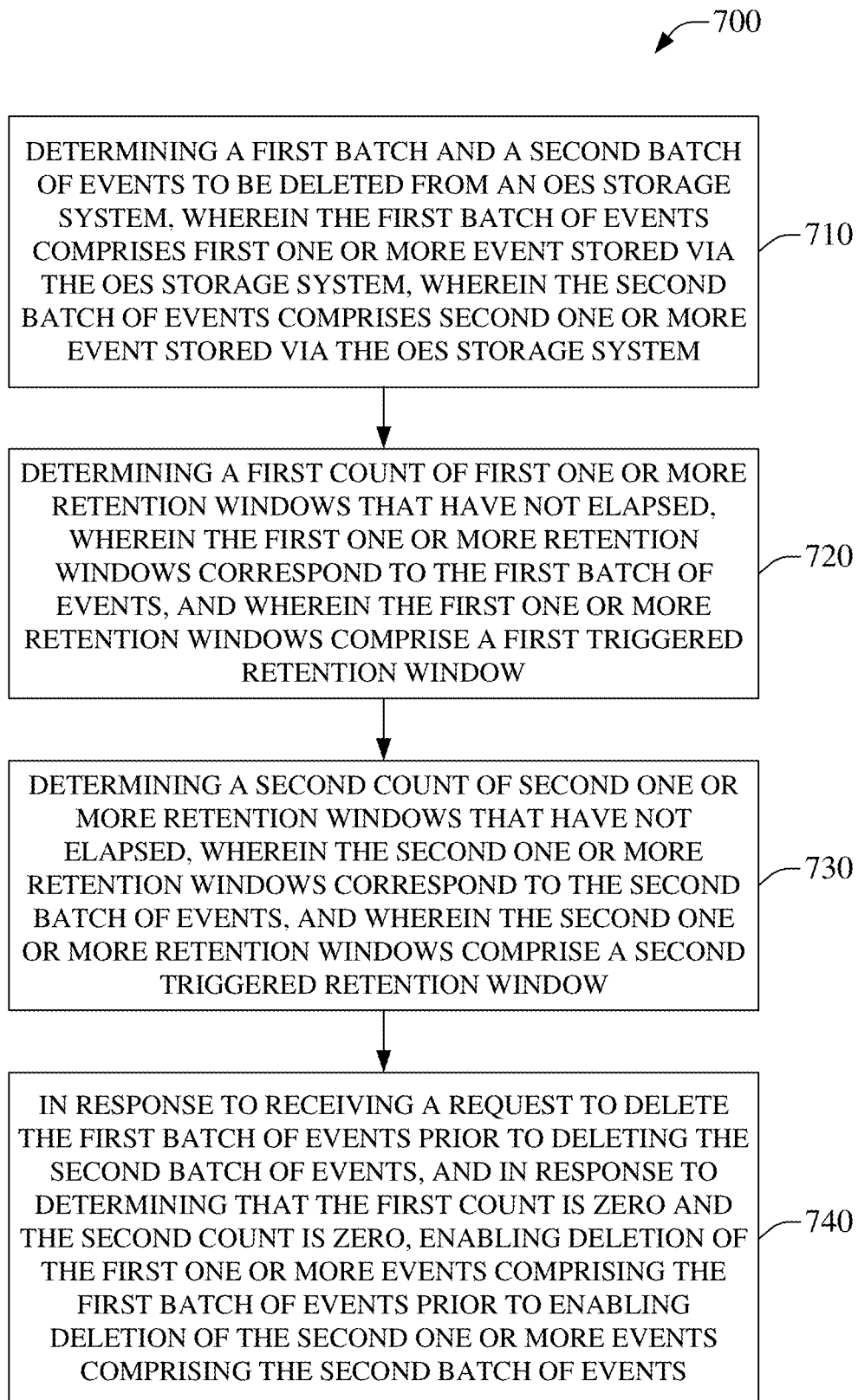
FIG. 7 is an illustration of an example method facilitating retention of one or more batches of events of one or more segments of one or more ordered event streams, in accordance with aspects of the subject disclosure.
Figure 8:
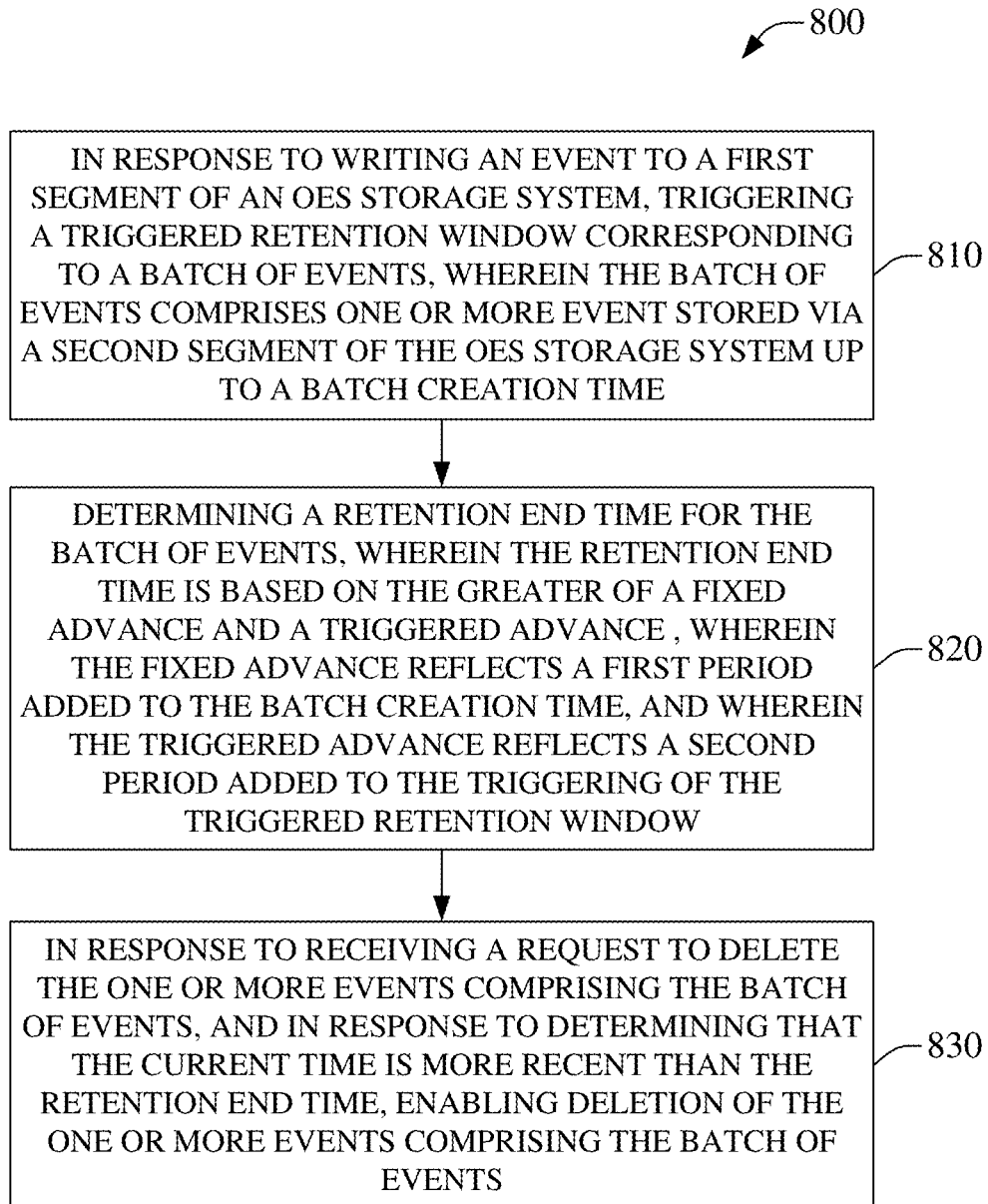
FIG. 8 is an illustration of an example method facilitating determining a retention end time corresponding to retention of a batch of events stored via an ordered event stream, in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternately be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 is an illustration of an example method 600, which can facilitate retention of an event of a segment of an ordered event stream, in accordance with aspects of the subject disclosure. At 610, method 600 can comprise determining a batch of events to be deleted from an OES storage system. The batch of events can comprise one or more event stored via the OES. In an aspect, in an event-level application of method 600, the batch can comprise a single event such that the progress of method 600 corresponds to deletion of a single event based on the single event not having any active retention windows, e.g., all retention windows, both fixed and triggered, can have elapsed prior to any deletion of the event being enabled. In another aspect, method 600 can correspond to batches of more than one event. In this aspect, a batch can comprise, for example, events from one or more segments of one or more OESs of one or more scopes of one or more OE storage systems, etc.

At 620, method 600 can comprise determining a first count of one or more fixed retention windows that have not elapsed. The one or more fixed retention windows can correspond to the batch of events. In an aspect, where the batch is one event, the fixed retention window can, in some embodiments, begin from the writing of the event to the stream. In this aspect, the fixed retention window can act as a minimum retention window, e.g., even if all triggered retention windows can have elapsed, the fixed retention window can allow for retention for the fixed time, which can be a minimum retention time. In regard to a batch comprising more than one event, a fixed retention window can act to provide a minimum retention of events in that the fixed period can begin at a time of the most recent event of the batch, such that all other events of the batch can be the same age or older, whereby the fixed period can then ensure that all events being deleted via the batch of events are at least as old as the most recent event of the batch plus the fixed period. As an example, an injection molding process can elapse a targeted retention window when a widget passes quality control (QC'ed). In this example, the targeted window can occur on the order of hours to a few days after an event is written, for example, depending on the staffing and the day of the week, e.g., widgets made on Friday afternoon might not get QC'ed until Monday or Tuesday the next week, etc. Accordingly, a fixed retention window on the order of two days can act as a minimum retention time in this example. As such, in this example, even where the triggered retention window can elapse quickly for widgets made on a Thursday, e.g., they can be QC'ed in a few hours, the events can be retained for at least two days because of the fixed window. Moreover, where a batch of widgets is not QC'ed quickly, e.g., widgets made on Friday evening, etc., the events can be promptly deleted when they are QC'ed because the fixed retention period can have already expired over the weekend in this example.

Method 600, at 630, can comprise determining a second count of one or more triggered retention windows that have not elapsed and that correspond to the batch of events. This can be similar to counting fixed retention windows at 620, except applied to triggered retention windows. Method 600 should have at least one triggered retention window to be analyzed at 630, e.g., a triggered retention window that has elapsed, has not elapsed, or that has not yet been triggered, should be related to the batch of events in method 600. In an aspect, there can be more than one triggered retention window. Moreover, there can be one or more fixed retention window at 620. In an aspect, the triggered retention window can be an affirmative trigger, e.g., an occurrence can trigger activation of the triggered event window, or can be a negative trigger, e.g., lack of an occurrence triggers the activation, while the presence of a triggering occurrence can pause, restart, end, etc., the triggered retention window. Accordingly, combinations of affirmative and negative triggers, as well as combinations of one or more triggered retention windows with, or without, one or more fixed retention windows, can allow methods, e.g., method 600, 700, 800, etc., to perform complex event retention logic for single events and/or batches of events.

At 640, method 600 can comprise, enabling deletion of the one or more events comprising the batch of events. At this point method 600 can end. The enabling deletion can be in response to receiving a request to delete the one or more events of the batch as well as determining that the first count and the second count are zero. In an aspect, the determining that the first and second counts are zero can indicate that all relevant retention windows, e.g., the at least one triggered retention window and any fixed retention windows, have elapsed. Where there is a retention window that has not elapsed, the retention window would be counted and the first and second counts could not be zero. As such, a zero count for the first and second counts can indicate that all retention windows have properly elapsed and that the batch of events can be ready to be deleted from a retention policy standpoint. As such, method 600 can enable deletion of the batch of events, e.g., can indicate that deletion is permitted in regard to event retention policies, such as via TRC 120, 220, 320, 420, 520, etc.

FIG. 7 is an illustration of an example method 700, which can facilitate retention of one or more batches of events of one or more segments of one or more ordered event streams, in accordance with aspects of the subject disclosure. At 710, method 700 can comprise determining more than one batch, e.g., a first batch of events and a second batch of events, etc., to be deleted from an OES storage system. The batches of events each can comprise one or more event stored via an OES. In an aspect, any batch can comprise, for example, events from one or more segments of one or more OESs of one or more scopes of one or more OE storage systems, etc.

At 720, method 700 can comprise determining a first count of one or more retention windows that have not elapsed. The one or more retention windows can correspond to the first batch of events. In an aspect, the one or more retention windows can comprise at least one triggered, and any number of fixed, retention windows. The first count can therefore indicate if there are any unelapsed retention windows for the first batch of events, where an unelapsed retention window can be associated with indicating that the batch of events should be retained, e.g., an unelapsed retention window would be interpreted as the batch still being under retention.

At 730, method 700 can comprise determining a second count of one or more retention windows that have not elapsed. These one or more retention windows can correspond to the second batch of events. As above, the one or more retention windows can comprise at least one triggered, and any number of fixed, retention windows. The second count can therefore indicate if there are any unelapsed retention windows for the second batch of events.

In both 720 and 730, there can be more than one triggered retention window, there can be one or more fixed retention window, there can be combinations of fixed and triggered retention windows, etc. Moreover, in both 720 and 730, a triggered retention window can be affirmatively triggered, e.g., an occurrence can trigger activation of the triggered event window, or can be negatively triggered, e.g., lack of an occurrence triggers the activation, while the presence of a triggering occurrence can pause, restart, end, etc. As such, the triggered retention window, combinations of affirmative and negative triggers, as well as combinations of one or more triggered retention windows with, or without, one or more fixed retention windows, can allow methods, e.g., method 600, 700, 800, etc., to perform complex event retention logic for single events and/or batches of events.

At 740, method 700 can comprise, enabling deletion of the first one or more events comprising the first batch of events prior to enabling deletion of the second one or more events comprising the second batch of events. At this point method 700 can end. The enabling deletion can be in response to receiving a request to delete the first batch of events prior to deleting the second batch of events. Additionally, the enabling can be in response to determining that the first count and the second count are zero. In an aspect, the determining that the first and second counts are zero can indicate that all relevant retention windows have elapsed for both the first and second batches of events. Where there is a retention window that has not elapsed, the corresponding retention window would cause an indication that the relevant batch of events is not ready to be deleted from a retention policy standpoint. Accordingly, in this situation, the deletion of the first and second batches can be delayed or prevented. It is noted that where the first batch occurs before the second batch, and where the first count at 720 is zero, use of another method, e.g., method 600, etc., can allow for deletion of the first batch because it will not interfere with the events of the second batch that have a later SCO. However, it is further noted that where the first count is non-zero, then deletion of the first batch can be improper, e.g., the first batch should be under retention. Accordingly, deletion of the second batch can be problematic, in this example where the second batch occurs at a later progress point than the first batch. As such, in this example, the deletion of the second batch would not typically be permitted until the first count becomes zero. In this example, method 700 illustrates that ordering of event deletions can be accomplished via the disclosed subject matter.

FIG. 8 is an illustration of an example method 800, which can enable determining a retention end time corresponding to retention of a batch of events stored via an ordered event stream, in accordance with aspects of the subject disclosure. At 810, method 800 can comprise triggering a triggered retention window that can correspond to a batch of events. The triggering can be in response to writing an event to a first segment of an OES storage system, e.g., the writing of the event in the first segment can act as a trigger for a batch of events in other segments of an OES storage system. As an example, a stream cut object can be written to the first segment, which can trigger the triggered retention window of the batch of events at other OES segments. The batch of events can comprise one or more events stored via a second segment, wherein the one or more events occur before a batch creation time, e.g., all events of the batch can be stored in the OES prior to a batch creation time.

At 820, method 800 can comprise, determining a retention end time for the batch of events. The retention end time can be based on the greater of a fixed advance and a triggered advance. The fixed advance can reflect a first period added to the batch creation time, see, for example, FRP 233 in FIG. 2 but substituting the batch creation time for the creation time of event E2 at 237. The triggered advance can reflect a second period added to the triggering of the triggered retention window in 810, see, for example, TRP 234 being added to the trigger occurrence at 238 for event E2, but substitute the batch for event E2 in this example. Accordingly, the triggered advance can be at a later time than the fixed advance, e.g., as in event E2 of 230 in FIG. 2. Alternatively, the fixed advance can be at a later time than the triggered advance, e.g., as in event E3 of 230 in FIG. 2.

Method 800, at 830, can comprise enabling deletion of the one or more events comprising the batch of events. At this point method 800 can end. The enabling deletion can be in response to receiving a request to delete the one or more events of the batch as well as determining that a current time is more recent than the retention end time determined at 820. Looking again to FIG. 2, as an example, in each of events E1, E2, and E3, the event is deleted at 239, which occurs at a more recent time that the corresponding fixed advances and triggered advances in each of the example events. In contrast, see FIG. 4, where the triggered advance, e.g., TRP 442' can occur at a time after the current time, e.g., 444'>now in 430 of FIG. 4. Where the retention end time is greater than the current time, this can indicate that the retention period has not elapsed, the event/batch should remain under retention, and that a request to delete should not be given permission accordingly. Where there is a retention window that has elapsed, retention windows can be considered elapsed prior to the current time and deletion of the event/batch can be permitted. As such, method 800 can enable deletion of the batch of events, e.g., can indicate that deletion is permitted in regard to event retention policies, such as via TRC 120, 220, 320, 420, 520, etc.

Figure 9:
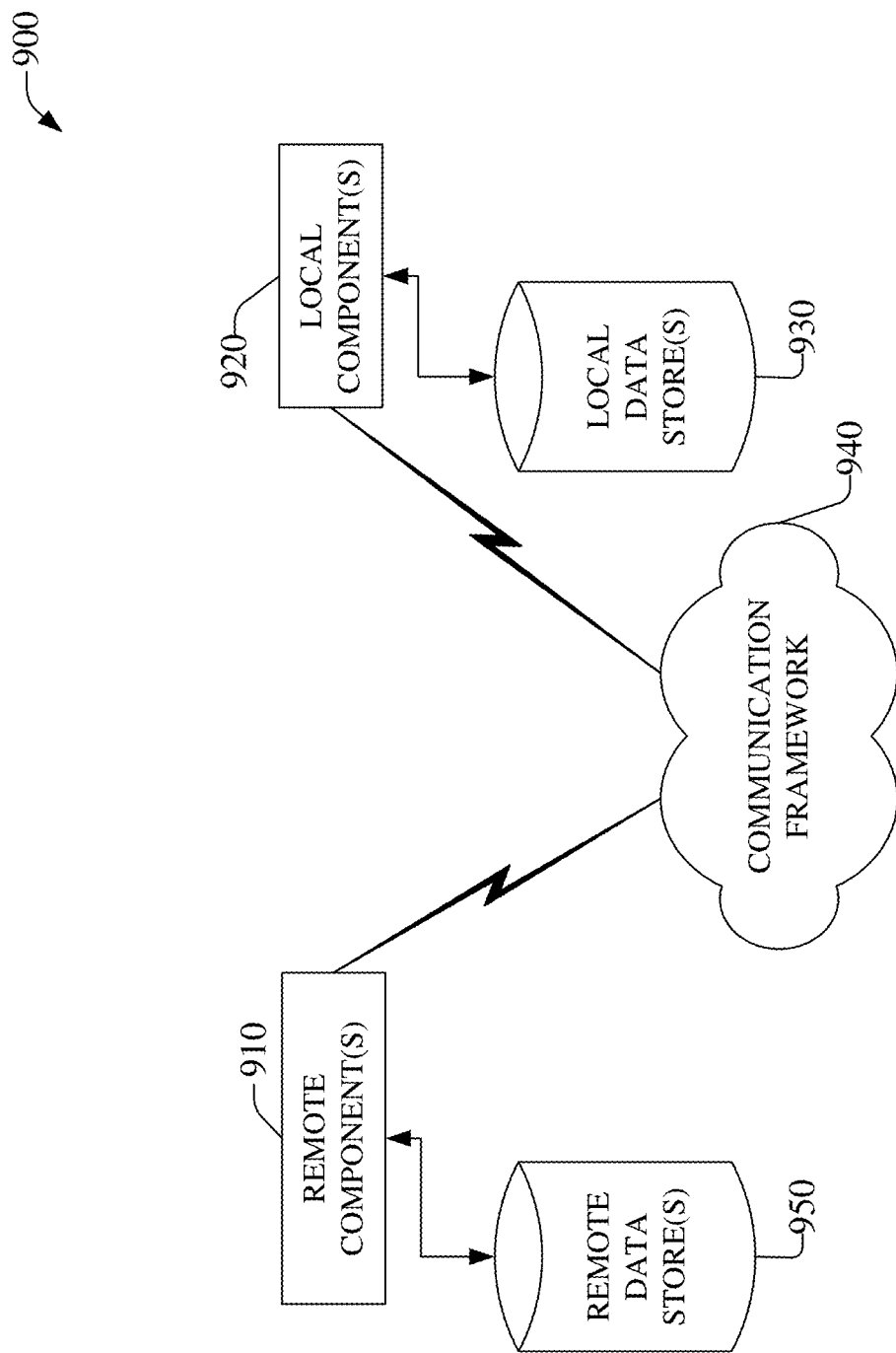
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a remotely located device comprised in storage component 102, 202, 302, 402, 502, etc., a remotely located processor device comprised in processor component 104, 204, 304, 404, 504, etc., a remotely located device comprised in triggered retention component 120, 220, 320, 420, 520, etc., or other remotely located devices, which can be connected to a local component via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise a local device comprised in storage component 102, 202, 302, 402, 502, etc., a locally located processor device comprised in processor component 104, 204, 304, 404, 504, etc., a locally located device comprised in triggered retention component 120, 220, 320, 420, 520, etc., or other locally located devices.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940. As examples, writing, reading, erasing, expiring, etc., of events of segments of an OES(s) in systems 100, 200, 300, 400, 500, etc., can be communicated via communication framework 940 among storage components of an OES storage network 100, 200, 300, 400, 500, etc., e.g., to facilitate adapting, altering, modifying, erasing, deleting, freeing, etc., events stored via one or more OES(s), as disclosed herein.

Figure 10:
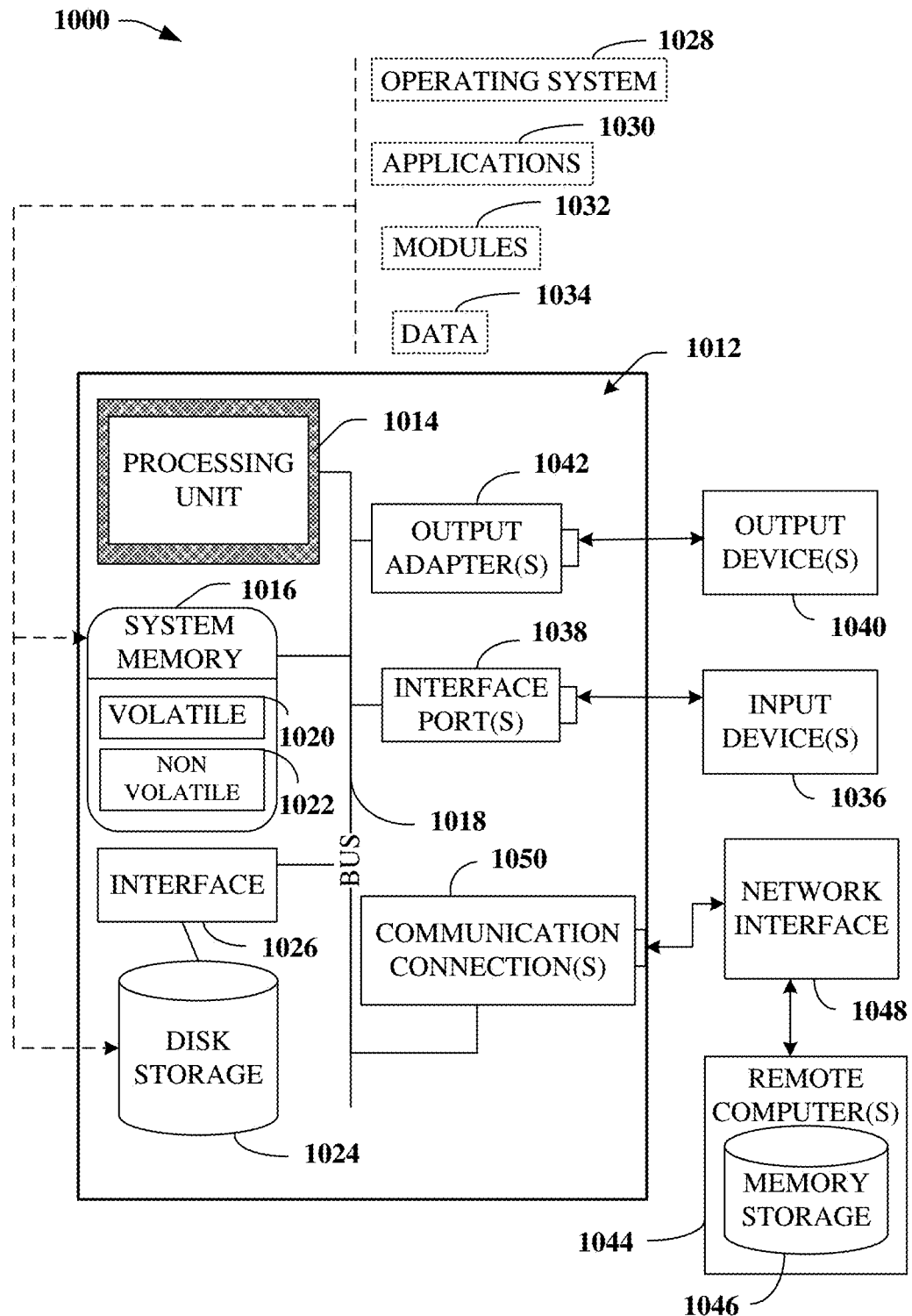
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in any of storage component 102-502, processor component 104-504, TRC 120-520, etc., can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations comprising determining that a request to delete one or more events stored via an ordered event stream storage system has occurred, selecting a batch of events to be deleted from the ordered event stream storage system based on the request, and in response to determining that at least one triggered retention policy corresponding to the batch of events has been satisfied, facilitating deletion of the events of the batch of events.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial bus port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access;

enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength ($\lambda$) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
      determining a batch of events to be deleted from an ordered event stream stored via an ordered event stream storage system, wherein the batch of events corresponds to one or more triggered retention windows;
      determining a first count of retention windows that have not elapsed, wherein the determining the first count of retention windows that have not elapsed comprises determining a second count of unelapsed triggered retention windows of the one or more triggered retention windows; and
      in response to determining that the first count is zero, facilitating deletion of events comprised in the batch of events.

2. The system of claim 1, wherein a triggered retention window of the one or more triggered retention windows is an affirmatively triggered retention window.

3. The system of claim 1, wherein a triggered retention window of the one or more triggered retention windows is a negatively triggered retention window.

4. The system of claim 3, wherein a progression of the negatively triggered retention window is restarted in response to an affirmative trigger occurring.

5. The system of claim 1, wherein the batch of events corresponds to one or more fixed retention windows, and wherein the determining the first count of retention windows that have not elapsed comprises determining a third count of unelapsed fixed retention windows of the one or more fixed retention windows.

6. The system of claim 1, wherein the determining the batch of events to be deleted is based on receiving a request to truncate the ordered event stream from a determined progress point.

7. The system of claim 1, wherein the determining the batch of events to be deleted results in the batch comprising one event.

8. The system of claim 1, wherein the determining the batch of events to be deleted results in the batch comprising more than one event.

9. The system of claim 8, wherein the more than one event are stored in one segment of the ordered event stream.

10. The system of claim 8, wherein the more than one event are stored among more than one segment of the ordered event stream.

11. A method, comprising:
    in response to receiving a request to delete one or more events stored via an ordered event stream storage system, determining, by a system comprising a processor, a batch of events to be deleted from the ordered event stream storage system, wherein the batch of events corresponds to one or more triggered retention windows comprising a first count of retention windows that have not elapsed and a second count of triggered retention windows that have not elapsed;
    determining, by the system, that at least one retention policy corresponding to the batch of events has been satisfied; and
    indicating, by the system, a permission to delete the events of the batch of events based on the determining that the at least one retention policy has been satisfied.

12. The method of claim 11, wherein the determining that at least one retention policy has been satisfied comprises determining that at least one triggered retention policy has been satisfied.

13. The method of claim 12, wherein the determining that at least one retention policy has been satisfied further comprises determining that at least one fixed retention policy has been satisfied.

14. The method of claim 11, wherein the one or more events are stored via one or more segments of one or more ordered event streams of one or more scopes of the ordered event stream storage system, and wherein a scope is equivalent to a namespace.

15. A non-transitory machine-readable medium, comprising executable instructions that, when executed by a processor, facilitate performance of operations, comprising:
    determining that a request to delete one or more events stored via an ordered event stream storage system has occurred;
    selecting a batch of events to be deleted from the ordered event stream storage system based on the request, wherein the batch of events corresponds to one or more triggered retention windows comprising a first count of retention windows that have not elapsed and a second count of triggered retention windows that have not elapsed; and in response to determining that at least one triggered retention policy corresponding to the batch of events has been satisfied, facilitating deletion of the events of the batch of events.

16. The non-transitory machine-readable medium of claim 15, wherein the at least one triggered retention policies comprise an affirmatively triggered retention policy that activates a first triggered retention window in response to determining an occurrence of a trigger.

17. The non-transitory machine-readable medium of claim 15, wherein the at least one triggered retention policies comprise an inverted trigger retention policy that is permits a first triggered retention window to be active in response to determining an occurrence of a trigger has not occurred.

18. The non-transitory machine-readable medium of claim 17, wherein the inverted trigger retention policy resets elapsed activity of the first triggered retention window as a second triggered retention window in response to determining an occurrence of a trigger has occurred.

19. The non-transitory machine-readable medium of claim 15, wherein the facilitating of the deletion of the events of the batch of events is further in response to determining that at least one fixed retention policy corresponding to the batch of events has also been satisfied.

20. The non-transitory machine-readable medium of claim 15, wherein a triggered retention window of the one or more triggered retention windows is a negatively triggered retention window.

* * * * *